(12) United States Patent
Robertson

(10) Patent No.: US 11,191,215 B1
(45) Date of Patent: Dec. 7, 2021

(54) DYNAMICALLY OPERATED CONCAVE THRESHING BAR

(71) Applicant: Brian G. Robertson, Frisco, TX (US)

(72) Inventor: Brian G. Robertson, Frisco, TX (US)

( * ) Notice: Subject to any disclaimer, the term of this patent is extended or adjusted under 35 U.S.C. 154(b) by 0 days.

(21) Appl. No.: 17/099,601

(22) Filed: Nov. 16, 2020

Related U.S. Application Data

(63) Continuation-in-part of application No. 29/754,179, filed on Oct. 7, 2020, and a continuation-in-part of application No. 17/008,430, filed on Aug. 31, 2020, now Pat. No. 11,064,655, and a continuation-in-part of application No. 16/860,845, filed on Apr. 28, 2020, now Pat. No. 10,905,050, and a continuation-in-part of application No. 16/826,194, filed on Mar. 21, 2020, and a continuation-in-part of application No. 29/696,475, filed on Jun. 27, 2019, said application No. 16/826,194 is a continuation-in-part of application No. 29/680,208, filed on Feb. 14, 2019, (Continued)

(51) Int. Cl.
| | |
|---|---|
| *A01F 12/28* | (2006.01) |
| *A01F 12/26* | (2006.01) |
| *A01F 12/24* | (2006.01) |
| *A01F 12/18* | (2006.01) |
| *A01D 41/127* | (2006.01) |

(52) U.S. Cl.
CPC .......... *A01F 12/28* (2013.01); *A01D 41/127* (2013.01); *A01D 41/1276* (2013.01); *A01F 12/181* (2013.01); *A01F 12/24* (2013.01); *A01F 12/26* (2013.01)

(58) Field of Classification Search
CPC .......... A01F 12/26; A01F 12/28; A01F 12/24; A01F 12/181; A01F 12/20; A01F 12/22; A01F 7/04; A01F 7/06; A01F 7/067; A01D 41/127–1272; A01D 41/1276; A01D 41/1277; B07B 1/4636; B07B 1/12
USPC .......................................... 209/395, 668, 676
See application file for complete search history.

(56) References Cited

U.S. PATENT DOCUMENTS

| | | | | |
|---|---|---|---|---|
| 156,701 A | * | 11/1874 | Gray ........................ | A01F 12/28 460/109 |
| 172,171 A | * | 1/1876 | Reeder .................... | A01F 12/26 460/107 |

(Continued)

FOREIGN PATENT DOCUMENTS

| | | | | |
|---|---|---|---|---|
| CA | 2297624 A1 | | 1/2001 | |
| DE | 3832996 A1 | * | 4/1989 | ............. A01F 12/24 |

(Continued)

*Primary Examiner* — Thomas B Will
*Assistant Examiner* — Joan D Misa
(74) *Attorney, Agent, or Firm* — Law Office of Sam Sokhansanj PLLC

(57) ABSTRACT

A dynamically operated concave threshing bar system, method, and apparatus wherein one or more threshing bars within a concave can dynamically move to various positions in real-time based on one or more conditions such as the type crop being harvested and on a determination by a combine harvester's computerized system, artificial intelligence (AI) system, or upon the operators input, among others. The concave can include a concave frame having a pair of arcuate side members, a threshing bar, and an actuator coupled to the threshing bar, wherein the actuator can be configured to move the threshing bar along the arcuate side members of the concave frame.

20 Claims, 12 Drawing Sheets

Related U.S. Application Data and a continuation-in-part of application No. 29/670,114, filed on Nov. 13, 2018, said application No. 17/008,430 is a continuation of application No. 16/115,331, filed on Aug. 28, 2018, now Pat. No. 10,785,916, which is a continuation-in-part of application No. 15/856,381, filed on Dec. 28, 2017, now Pat. No. 10,716,260, and a continuation-in-part of application No. 15/856,402, filed on Dec. 28, 2017, now Pat. No. 11,134,613.

(60) Provisional application No. 62/821,570, filed on Mar. 21, 2019.

(56) References Cited

U.S. PATENT DOCUMENTS

| | | | | |
|---|---|---|---|---|
| 247,962 | A * | 10/1881 | Stevens | A01F 12/28 460/109 |
| 320,288 | A * | 6/1885 | Roberts | A01F 12/24 460/110 |
| 433,044 | A * | 7/1890 | Schmalz et al. | A01F 12/28 460/109 |
| 489,724 | A * | 1/1893 | Watts | A01F 12/28 460/109 |
| 520,725 | A * | 5/1894 | Broatch | A01F 12/28 460/109 |
| 750,902 | A * | 2/1904 | Shelton et al. | A01F 12/28 460/109 |
| 934,106 | A * | 9/1909 | Storer | A01F 12/28 460/109 |
| 948,277 | A * | 2/1910 | Hay | A01F 12/28 460/109 |
| 949,049 | A * | 2/1910 | Amble | A01F 12/26 460/107 |
| 953,845 | A * | 4/1910 | Knaak | A01F 12/28 460/109 |
| 970,973 | A * | 9/1910 | Thompson | A01F 12/28 460/109 |
| 993,193 | A * | 5/1911 | Pelican | A01F 12/26 460/107 |
| 1,034,469 | A * | 8/1912 | Larson | A01F 12/28 460/109 |
| 1,127,640 | A * | 2/1915 | Knaak | A01F 12/28 460/109 |
| 1,138,835 | A * | 5/1915 | Bergren | A01F 12/28 460/109 |
| 1,191,853 | A * | 7/1916 | Thompson | A01F 12/44 460/84 |
| 1,226,601 | A * | 5/1917 | Schwartz | A01F 12/28 460/109 |
| 1,260,140 | A * | 3/1918 | Buchanan | A01F 12/28 460/109 |
| 1,269,109 | A * | 6/1918 | Noack | A01F 12/28 460/109 |
| 1,449,645 | A * | 3/1923 | Anderson | A01F 12/28 460/110 |
| 1,581,835 | A * | 4/1926 | Brown | A01F 12/24 460/109 |
| 2,159,664 | A | 5/1939 | Lindgren | |
| 2,305,964 | A | 12/1942 | Harrison et al. | |
| 2,457,259 | A * | 12/1948 | Moll | A01F 12/24 460/110 |
| 2,833,288 | A | 12/1953 | Scranton | |
| 2,686,523 | A | 8/1954 | Young | |
| 2,937,647 | A | 5/1960 | Allen et al. | |
| 3,092,115 | A | 6/1963 | Morgan | |
| 3,191,607 | A | 6/1965 | Baumeister et al. | |
| 3,439,684 | A | 4/1969 | Davidow et al. | |
| 3,568,682 | A | 3/1971 | Knapp et al. | |
| 3,696,815 | A | 10/1972 | Rowland-Hill et al. | |
| 3,983,883 | A | 10/1976 | Ashton et al. | |
| 4,259,829 | A * | 4/1981 | Strubbe | A01D 41/1276 460/1 |
| 4,353,376 | A | 10/1982 | Schuler | |
| 4,466,231 | A * | 8/1984 | Rowland-Hill | A01F 12/448 460/2 |
| 4,495,954 | A | 1/1985 | Yarbrough | |
| 4,499,908 | A | 2/1985 | Niehaus | |
| 4,875,891 | A * | 10/1989 | Turner | A01F 12/24 460/110 |
| 4,897,071 | A * | 1/1990 | Desnijder | A01D 75/282 460/10 |
| 5,489,239 | A | 2/1996 | Matousek et al. | |
| 5,569,080 | A | 10/1996 | Estes | |
| 5,586,033 | A * | 12/1996 | Hall | A01D 41/127 701/50 |
| 5,613,907 | A | 3/1997 | Harden | |
| 6,074,297 | A | 6/2000 | Kuchar | |
| 6,193,604 | B1 | 2/2001 | Ramp et al. | |
| 6,468,154 | B1 * | 10/2002 | Eggenhaus | A01F 12/448 460/101 |
| 6,537,148 | B2 | 3/2003 | Schwersmann | |
| 6,802,771 | B2 * | 10/2004 | Schwersmann | A01F 12/442 460/109 |
| 6,890,253 | B2 * | 5/2005 | Mammen | A01F 12/448 460/101 |
| 7,153,204 | B2 * | 12/2006 | Esken | A01F 12/28 460/109 |
| 7,163,457 | B2 * | 1/2007 | Esken | A01F 12/28 460/107 |
| 7,166,026 | B2 | 1/2007 | Ricketts et al. | |
| 7,207,882 | B2 | 4/2007 | Schmidt et al. | |
| 7,285,043 | B2 | 10/2007 | Foster et al. | |
| 7,857,690 | B2 * | 12/2010 | Yanke | A01F 12/28 460/109 |
| 7,997,967 | B2 * | 8/2011 | Ricketts | A01F 12/448 460/101 |
| 8,313,361 | B2 | 11/2012 | Flickinger et al. | |
| 8,454,416 | B1 | 6/2013 | Estes | |
| 8,636,568 | B1 | 1/2014 | Farley | |
| 8,690,652 | B1 | 4/2014 | Estes | |
| 8,721,411 | B2 | 5/2014 | Reiger et al. | |
| 9,149,002 | B2 * | 10/2015 | Bischoff | A01F 12/448 |
| 9,152,938 | B2 * | 10/2015 | Lang | A01B 79/005 |
| 9,215,845 | B2 | 12/2015 | Regier | |
| 9,629,308 | B2 * | 4/2017 | Scholer | A01D 41/1272 |
| 9,631,964 | B2 * | 4/2017 | Gelinske | G01F 1/662 |
| RE46,401 | E | 5/2017 | Estes | |
| 9,723,784 | B2 * | 8/2017 | Bremer | G01S 7/411 |
| 9,756,785 | B2 * | 9/2017 | Butts | G01S 7/411 |
| 9,775,290 | B2 * | 10/2017 | Schleusner | B65G 43/08 |
| 9,779,330 | B2 * | 10/2017 | Wellington | G06K 9/6267 |
| 10,045,487 | B1 | 8/2018 | Robertson | |
| 10,085,379 | B2 * | 10/2018 | Schleusner | G01S 13/867 |
| 10,188,035 | B2 * | 1/2019 | Reich | B65G 43/08 |
| 10,310,455 | B2 * | 6/2019 | Blank | G06Q 10/06 |
| 10,318,138 | B2 * | 6/2019 | Scholer | A01D 41/1277 |
| 10,412,895 | B2 * | 9/2019 | Theisen | A01F 12/26 |
| 10,512,217 | B2 * | 12/2019 | Puvak | A01D 41/1272 |
| 10,694,668 | B2 * | 6/2020 | Blank | A01D 41/127 |
| 10,716,260 | B2 | 7/2020 | Robertson | |
| 10,785,916 | B2 | 9/2020 | Robertson | |
| 10,905,050 | B2 | 2/2021 | Robertson | |
| 2002/0006816 | A1 * | 1/2002 | Buermann | A01F 12/448 460/42 |
| 2005/0197176 | A1 | 9/2005 | Foster et al. | |
| 2006/0128451 | A1 | 6/2006 | Ricketts et al. | |
| 2006/0128452 | A1 | 6/2006 | Esken et al. | |
| 2011/0143827 | A1 | 6/2011 | Flickinger et al. | |
| 2014/0087793 | A1 | 3/2014 | Regier | |
| 2015/0046043 | A1 * | 2/2015 | Bollin | B60W 50/08 701/50 |
| 2015/0250101 | A1 | 9/2015 | Kile | |
| 2016/0345499 | A1 | 12/2016 | Van Hullebusch | |
| 2016/0353662 | A1 | 12/2016 | Haus et al. | |

(56) References Cited

U.S. PATENT DOCUMENTS

2017/0290263 A1* 10/2017 Kemmner ............... A01F 7/067
2018/0103588 A1    4/2018 Ritter

FOREIGN PATENT DOCUMENTS

| FR | 637181 A   * | 4/1928  | ............. A01F 12/28 |
| WO | WO0124609 A1 | 4/2001  | |
| WO | WO-0219795 A1 * | 3/2002 | ............. A01F 12/26 |
| WO | WO-2018185035 A1 * | 10/2018 | ............. A01F 12/28 |

* cited by examiner

DYNAMICALLY OPERATED CONCAVE THRESHING BAR

CROSS REFERENCE TO RELATED APPLICATIONS

This application is a continuation-in-part (CIP) of U.S. Non-Provisional application Ser. No. 17/008,430 filed on Aug. 31, 2020, which is incorporated herein by reference in its entirety, which is a continuation of U.S. Non-Provisional application Ser. No. 16/115,331 filed on Aug. 28, 2018, which is incorporated herein by reference in its entirety, which is a continuation-in-part (CIP) of U.S. Non-Provisional application Ser. No. 15/856,381 filed on Dec. 28, 2017 and issued on Jul. 21, 2020 as U.S. Pat. No. 10,716,260, which is incorporated herein by reference in its entirety, and a continuation-in-part (CIP) of U.S. Non-Provisional application Ser. No. 15/856,402, filed on Dec. 28, 2017, which is incorporated herein by reference in its entirety.

This application is a continuation-in-part (CIP) of U.S. Non-Provisional application Ser. No. 16/826,194 filed on Mar. 21, 2020, which incorporated herein by referenced in its entirety, which claims the benefit of U.S. Provisional Application No. 62/821,570 filed on Mar. 21, 2019, which is incorporated herein by reference in its entirety; U.S. Non-Provisional application Ser. No. 16/826,194 filed on Mar. 21, 2020 is also a continuation-in-part (CIP) of U.S. Design Application No. 29680208 filed on Feb. 14, 2019, which is incorporated herein by reference in its entirety; U.S. Non-Provisional application Ser. No. 16/826,194 filed on Mar. 21, 2020 is also a continuation-in-part (CIP) of U.S. Design Pat. No. 29670114 filed Nov. 13, 2018, which is incorporated herein by reference in its entirety.

This application is a continuation-in-part (CIP) of U.S. Non-Provisional application Ser. No. 16/860,845 filed on Apr. 28, 2020, which is incorporated herein by reference in its entirety.

This application is a continuation-in-part (CIP) of U.S. Design Pat. No. 29754179 filed on Oct. 7, 2020, which is incorporated herein by reference in its entirety.

This application is a continuation-in-part (CIP) of U.S. Design Pat. No. 29696475 filed on Jun. 27, 2019, which is incorporated herein by reference in its entirety.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Generally, a combine harvester is a machine that is used to harvest grain and seed crops, which can commonly be referred to as "grain". The main objective of the combine harvester is to complete several processes, which traditionally were distinct, in one pass of the machine over a particular part of a field. Among the crops that may be harvested with a combine can include but is not limited to wheat, oats, rye, peas, edible beans, barley, corn, soybeans, milo, rice, flax, durum, popcorn, sesame, lentils and canola. Generally, the combine harvester includes a header, which removes the crop from the field, and a feeder housing and an adjoining drum transports the crop matter into a threshing rotor. The crop before entering the threshing rotor is not threshed, meaning the grain is still connected to the crop or plant itself, which can be referred to as unthreshed. The process of threshing is removing the grain or seed from the crop, which can be referred to as threshing. The threshing rotor can include one or more rotors, which can extend axially (front to rear) or transversely within the body of the combine, which are partially or fully surrounded by one or more concaves or grates with perforations or apertures.

In particular, there may be a rotor having threshing concaves with bars, rods or wires for threshing operations of the crop, whereby threshing occurs. Once threshing operations are complete and the grain has been removed from the crop, the mix of threshed grain and "crop material" continue towards the rear of the combine harvester and enter the separating operations. This "crop material" is generally known as waste, chaff, or material-other-than-grain and includes but it not limited to straw, husks, stalks, shucks, hulls, awns, leaves, roots, fodder, sheath, stover and other plant material (hereinafter "MOG"). In particular, there may be a rotor having separation grates, sometimes known as separation concaves, with slots, wires or fingers for the separating operations, also sometimes referred to as the separator. The separating operations includes the process of separating the mix of threshed grain from MOG, whereby the threshed grain exits the rotor continuing onto the cleaning operations of the combine harvester, generally beneath the threshing rotor. The MOG continues rearwardly and exits out of the back of the combine, left on the ground behind the machine. The threshed grain continues through cleaning operations, which may include an auger, cleaning pan, fan and one or more sieves or chaffers. The cleaning operation uses air in combination with sieves to rid the grain of any remaining small pieces of MOG that might have exited the rotor with the grain. The clean grain continues to the clean grain elevator, which transports the threshed clean grain to the grain tank. In summary, the crop moves systematically through the combine harvester from front to rear, first being cut by the header, threshed by threshing operations, separated by separating operations where ultimately clean threshed grain ends up in the combine harvester's grain tank and MOG exits the combine harvester.

However, current conventional concave bars and separation grates have certain configurations that are not optimized to minimize grain damage while simultaneously maximizing threshing and separating of the crop material, thereby resulting in inefficient harvesting, damaged, and wasted crop. In one example of traditional combine concaves, if a combine harvester has three concaves, then a crop that is threshed in a first concave, has a two-third probability for the threshed grains to fall through the concave openings. However, if the crop does not get threshed until the second concave, then it only has a one-third probability for the threshed grains to fall through the concave openings. Further, if the crop is not threshed in the second concave, then the third concave can become overloaded with crop and grain material and operating at over capacity, thus resulting in the grain being discharged out the back of the combine and resulting in very inefficient harvesting.

Current combine harvester concaves have threshing bars that are fixed or secured to the concave frame without any independent degree of movement within the concave frame during the threshing operations, specifically the distance between threshing bars is fixed, their position is fixed, and their orientation is fixed. If the concave frame moves, the fixed threshing bars within the concave frame obviously move with the frame; however, if the concave frame is in a fixed, immovable, constant position, the threshing bars have zero degree of movement within said concave frame. Accordingly, the concave threshing bars, independent of the concave frame, cannot dynamically or in real-time move to adapt or optimize to the crop being harvested or to the specific crop characteristics or to specific performance parameters, benchmarks or goals. For example, if given a traditional round (cylindrical) bar concave with about a 20 mm spacing between the threshing bars, the spacing between the bar will be appropriate for threshing average corn, but does not effectively thresh smaller crops such as soybeans, wheat or barley. The concave cannot dynamically change the position of its threshing bars to optimize its threshing efficacy for such crops or crops characteristics. Accordingly, the fixed spacing (distance) between the threshing bars can be too wide (too much distance between threshing bars) for crops smaller than corn, and consequently unthreshed soybean pods, wheat and barley heads fall through the relatively large openings unthreshed. This, unthreshed crop in the grain tank can happen with increased frequency the smaller the grain head is in size (e.g. millet, canola, flax, sesame, etc.) and with higher yields as there is more voluminous crop heads per plant in a combine at any point in time relative to a lower yielding crop. In other words, there is an increasing chance for unthreshed crop to end up in the grain tank as yields increase. It is also notable that the harder it is to thresh the crop, the longer the time that the crop needs to stay in the threshing operations, thus, the more chance it has of falling through the threshing concave unthreshed. This is especially troublesome in hard-threshing wheat whereby the wheat is hard threshing and small in size. The main purpose of the concave and combine is to effectively thresh crops. When the combine's grain tank contains unthreshed grain, this grain is not usable or sellable and can result in a complete loss to the farmer, lost time planting, growing, and harvesting the crop and the expenses incurred therein, and ultimately lost revenue and risk to sustainability. Furthermore, even within the same crop such as corn, the fixed concave threshing bar spacing may not be optimal for maximum threshing efficacy. For example, there are a variety corn varieties and hybrids, all of which produce significantly different ear sizes and diameters. Even within the same variety or hybrid of corn, a farmer may experience vastly different ear sizes and diameters at time of harvest due to soil differences, elevation, weather, rainfall, wind, stress among others; and many times even within the same field. Here, the term "ear" generally refers to a cob of corn unthreshed, with its kernels still attached to the cob. If a farmer had a corn crop with ear diameters ranging anywhere from about 20 mm to about 60 mm which (sometimes within the same field) the 20 mm ear needs significantly closer spacing (distance) of threshing bars to thresh effectively than a 40 mm or 60 mm ear. If one were to use the spacing of threshing bars optimized for a 60 mm ear when harvesting a 20 mm cob, the 20 mm cob would fall through the spacing between the bars in whole and unthreshed.

Hence, there is a need for a system, method, and apparatus whereby the threshing bars within a concave that can dynamically move to various positions and modify the spacing between each threshing bar, in real-time, based on the crop being harvested and other conditions.

BRIEF SUMMARY

In one aspect of the disclosure described herein, a dynamically operated concave threshing bar (hereinafter "DTB") system, method, and apparatus is disclosed wherein the threshing bars within a concave can dynamically move to various positions, in real-time, based on the crop being harvested and other conditions, which can be further based on a determination by the combine's computerized system, artificial intelligence (AI) system, or upon the operators input. The DTB system, method, and apparatus of the disclosure described herein provides an efficient method of threshing crop. The computer implemented method, computerized system, or AI system of the combine uses various sensors and cameras that monitor crop conditions (crop disease, fungi, fungal-like organisms, bacteria, phytoplasmas, viruses, viroids, nematodes, parasites, etc.), harvest conditions (sunshine, rainfall, humidity, dew point, wind, atmospheric pressure, evapotranspiration, etc.), soil conditions (sandy-clay-loam mixture), crop characteristics (ear size, cob size, straw thickness, straw moisture, etc.) crop type (corn, soybeans, wheat, etc.), crop variety (manufacturer or hybrid), crop yield (unit of harvested grain per unit of land), crop moisture (moisture of crop), crop test weight (units of pounds per bushel of crop), crop protein (amount or percent of protein per grain), crop starch (amount or percent of starch per grain), crop oil (amount or percent of oil per grain), crop volume (volume per grain), crop grade (grade of crop USDA standards), bulk density (mass of grain per unit of volume), stalk moisture (moisture of plant stalk), leaf moisture (moisture of crop leafage) combine productivity (grain throughput divided by operation cost), engine revolutions per minute (RPM), engine usage (percent of engine capacity being used), horsepower consumption (percent of horsepower being used), fuel consumption (unit of fuel usage per unit of time), concave clearance (distance from rotor to concave), threshing pressure (measure of pressure in threshing operations), rotor speed (rotor revolutions per minute), rotor type (AFX, Specialty, Standard, TriStream, Variable Stream, Small Tube, etc), pinch point (point where concave touches the rotor), threshing angle (pitch, roll and yaw of a concave to the rotor), rotor elements (type and amount of rasp bars on rotor), gear ratio (ratio of gear driving rotor), gear position (gear combine motor is engaged), power band (horsepower produced at a specific engine RPM), sieve loss (amount of grain lost from the sieve), shoe loss (amount of grain lost from the shoe), separator loss (amount of grain lost from separation operations), cleaning loss (amount of grain lost from cleaning operations), separator clearance (distance from rotor to separator grate), grain loss (total amount of grain loss from separating and cleaning operations), grain divider position (position of grain divider), loss sensitivity (sensitivity of sensors that detect grain loss), threshing efficiency (measure of threshing per unit of time), separation efficiency (measure of separation per unit of time), ground speed (combine unit of travel distance per unit of time), elevator speed (speed at which grain is being transported), elevator throughput (amount of grain being processed by the elevator per unit of time), separator pressure (measure of pressure in separating operations), fan speed (speed at which fan is operating), feed accelerator speed (speed at which feed accelerator is operating), cross auger position (position auger is operating), drum speed (speed at which drum is operating), drum position (position drum is operating), paddle speed (speed at which paddle is operating), paddle position (position paddle is operating), auger speed (speed at which auger is operating), feederhouse position (position feederhouse is operating), feederhouse throughput (amount of grain being processed by the feederhouse per unit of time), gathering chain speed (speed at which gathering chain is operating), header speed (speed at which header is operating), header width (cutting width or number of rows of header), header cut height (height at which header is cutting), header angle (pitch and roll measurements of the header), header throughput (amount of crop being processed by the header per unit of time), header loss (amount of grain lost from header), cutting efficiency (measure of crop cut per unit of time), cutter bar position (position cutterbar is operating), cutterbar length (length of cutterbars), deck plate position (position deck plate is operating), stripper plate gap (gap stripper plate is operating), reel speed (speed at which reel is operating), combine angle (pitch and roll measurements of the combine), pre-sieve position (hole diameter and angle of comb pre-sieve is operating), sieve angle (pitch and roll measurements of the sieve), sieve position (hole diameter and angle of comb sieve is operating), chaffer position (hole diameter and angle of comb chaffer is operating), grain distribution (amount and position of grain), grain throughput (amount of grain being processed by combine per unit of time), bushels per hour, tailings (unthreshed grain), clean grain (threshed grain), clean grain foreign material (amount or percent of foreign material in clean grain), grain damage (amount or percent of damaged grain), whole grain (amount or percent of whole grain), grain damage position (location of damaged on grain), broken grain (amount or percent of broken grain), skinned grain (amount or percent of skinned grain), broken grain and foreign material (amount or percent of broken grain and foreign material per unit of volume), broken cobs (amount or percent of broken cobs), stress cracks (amount or percent of stress grain), fines (amount or percent of cracked, split grain), dockage (amount or percent of dockage of grain per unit of volume), straw quality (measure of straw damage), grain tank foreign material (amount of MOG per volume of clean grain in grain tank), grain size (physical size of grain), foreign material (also known as MOG), threshed grain (amount or percent of threshed grain per unit of volume), unthreshed grain (amount or percent of unthreshed grain per unit of volume), grain return (amount or percent of tailings), storability (measure of quality of storability of grain), threshing effectiveness (ratio of threshed grain to unthreshed grain), separation effectiveness (ratio of threshed grain continuing to cleaning operations to threshed grain exiting combine out of rotor), operational or performance parameters (input parameters by operator or AI system the combine is to operate within), operational or performance benchmarks (standards for operating or performance data to be compared to), operational or performance goals (performance goals input by the operator or AI system the combine is to optimize by changing various controllers or combine settings), operational or performance priorities (priority or weight of specific targeted goal), operational or performance sensitivity (time of reaction to deviations to performance parameters or goals), weather data, historical data (information from every sensor or metric the combine records, typically store in a database), fleet information (information shared from network or other combine harvesters), global positioning system (GPS) information, harvest data (yield maps from current and previous harvest at a particular GPS location), etc.

In another aspect of the disclosure described herein, a concave for threshing crop in a combine harvester. The concave can include a concave frame having a pair of arcuate side members, a threshing bar, wherein the threshing bar is disposed between the pair of arcuate side members of the concave frame, and an actuator coupled to the threshing bar, wherein the actuator is configured to move the threshing bar along the arcuate side members of the concave frame. In addition, the actuator can be operated by one or more controllers. The controller can be operated wirelessly or via a wired connection. The one or more controllers can be operated via a central computing system. The one or more controllers can be operated via an artificial intelligence system, neural network, or a machine learning algorithm. The artificial intelligence system, neural network, or a machine learning algorithm receives one or more of the following conditions: crop conditions, harvest conditions, soil conditions, crop characteristics, crop type, crop variety, crop yield, crop moisture, crop test weight, crop protein, crop starch, crop oil, crop volume, crop grade, bulk density, stalk moisture, leaf moisture, combine productivity, engine revolutions per minute (RPM), engine usage, horsepower consumption, fuel consumption, concave clearance, concave pressure, rotor speed, rotor type, pinch point, threshing angle, rotor elements, gear ratio, gear position, power band, sieve loss, shoe loss, separator loss, cleaning loss, separator clearance, grain loss, grain divider position, loss sensitivity, threshing efficiency, separation efficiency, ground speed, elevator speed, elevator throughput, separator pressure, fan speed, feed accelerator speed, cross auger position, drum speed, drum position, paddle speed, paddle position, drum position, auger speed, feeder house position, feederhouse throughput, gathering chain speed, header speed, header width, header cut height, header angle, header throughput, header loss, cutting efficiency, cutter bar position, cutterbar length, deck plate position, stripper plate gap, reel speed, combine angle, pre-sieve position, sieve angle, sieve position, chaffer position, grain distribution, grain throughput, bushels per hour, tailings, clean grain, clean grain foreign material, grain damage, whole grain, grain damage position, broken grain, skinned grain, broken grain and foreign material, broken cobs, stress cracks, fines, dockage, straw quality, grain tank sample, grain size, foreign material, threshed grain, unthreshed grain, grain return, storability, threshing effectiveness, separation effectiveness, operational or performance parameters, operational or performance benchmarks, operational or performance goals, operational or performance priorities, operational or performance sensitivity, weather data, soil data, historical data, fleet information, or global positioning system (GPS) information or historical data from previous harvests or fleet information that could be used to predict variances in yield rates at a particular GPS location.

In addition, the controller can be configured to send commands to the actuators via data received from the artificial intelligence system, neural network, or a machine learning algorithm. The one or more controllers can receive data from one or more sensors in communication with or detecting one or more conditions from concave frame or a combine harvester. The central computing system can receive data from one or more sensors in communication with or detecting one or more conditions from the concave frame or a combine harvester. The artificial intelligence system, neural network, or a machine learning algorithm can receive input data from one or more sensors in communication with or detecting one or more conditions from the concave frame or a combine harvester. The artificial intelligence system, neural network, or a machine learning algorithm receives data from one or more of the following sensors: pressure sensors, volume sensors, flow sensors, image sensors, moisture sensors, magnetic sensors, motion sensors or object detection sensors. The artificial intelligence system, neural network, or a machine learning algorithm receives data from one or more cameras capturing data from a chaffer, sieve, grain pan, clean grain elevator, grain auger, or grain tank of a combine harvester. The artificial intelligence system, neural network, or a machine learning algorithm can receive data from a plurality of sensors on the combine harvester. In addition, the artificial intelligence system, neural network, or a machine learning algorithm can receive data from a plurality of cameras on the combine harvester.

In another aspect of the disclosure described herein, a method of threshing crop in a combine harvester is disclosed. The method can include receiving one or more commands to operate one or more actuators in connection with a threshing bar, wherein the threshing bar is disposed between a pair of arcuate side members of a concave frame, and moving, via the actuators, the threshing bar along the arcuate side members of the concave frame to a first position. In addition, the method can include receiving the one or more commands at a controller. The method can also include operating the controller wirelessly or via a wired connection, operating the controller via a central computing system, or operating the controller based on data from an artificial intelligence system, neural network, or a machine learning algorithm. In addition, the artificial intelligence system, neural network, or a machine learning algorithm receives at least one of the following conditions: crop conditions, harvest conditions, soil conditions, crop characteristics, crop type, crop variety, crop yield, crop moisture, crop test weight, crop protein, crop starch, crop oil, crop volume, crop grade, bulk density, stalk moisture, leaf moisture, combine productivity, engine revolutions per minute (RPM), engine usage, horsepower consumption, fuel consumption, concave clearance, concave pressure, rotor speed, rotor type, pinch point, threshing angle, rotor elements, gear ratio, gear position, power band, sieve loss, shoe loss, separator loss, cleaning loss, separator clearance, grain loss, grain divider position, loss sensitivity, threshing efficiency, separation efficiency, ground speed, elevator speed, elevator throughput, separator pressure, fan speed, feed accelerator speed, cross auger position, drum speed, drum position, paddle speed, paddle position, drum position, auger speed, feeder house position, feederhouse throughput, gathering chain speed, header speed, header width, header cut height, header angle, header throughput, header loss, cutting efficiency, cutter bar position, cutterbar length, deck plate position, stripper plate gap, reel speed, combine angle, pre-sieve position, sieve angle, sieve position, chaffer position, grain distribution, grain throughput, bushels per hour, tailings, clean grain, clean grain foreign material, grain damage, whole grain, grain damage position, broken grain, skinned grain, broken grain and foreign material, broken cobs, stress cracks, fines, dockage, straw quality, grain tank sample, grain size, foreign material, threshed grain, unthreshed grain, grain return, storability, threshing effectiveness, separation effectiveness, operational or performance parameters, operational or performance benchmarks, operational or performance goals, operational or performance priorities, operational or performance sensitivity, weather data, soil data, historical data, fleet information, or global positioning system (GPS) information or historical data from previous harvests or fleet information that could be used to predict variances in yield rates at a particular GPS location.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

Figure 1:
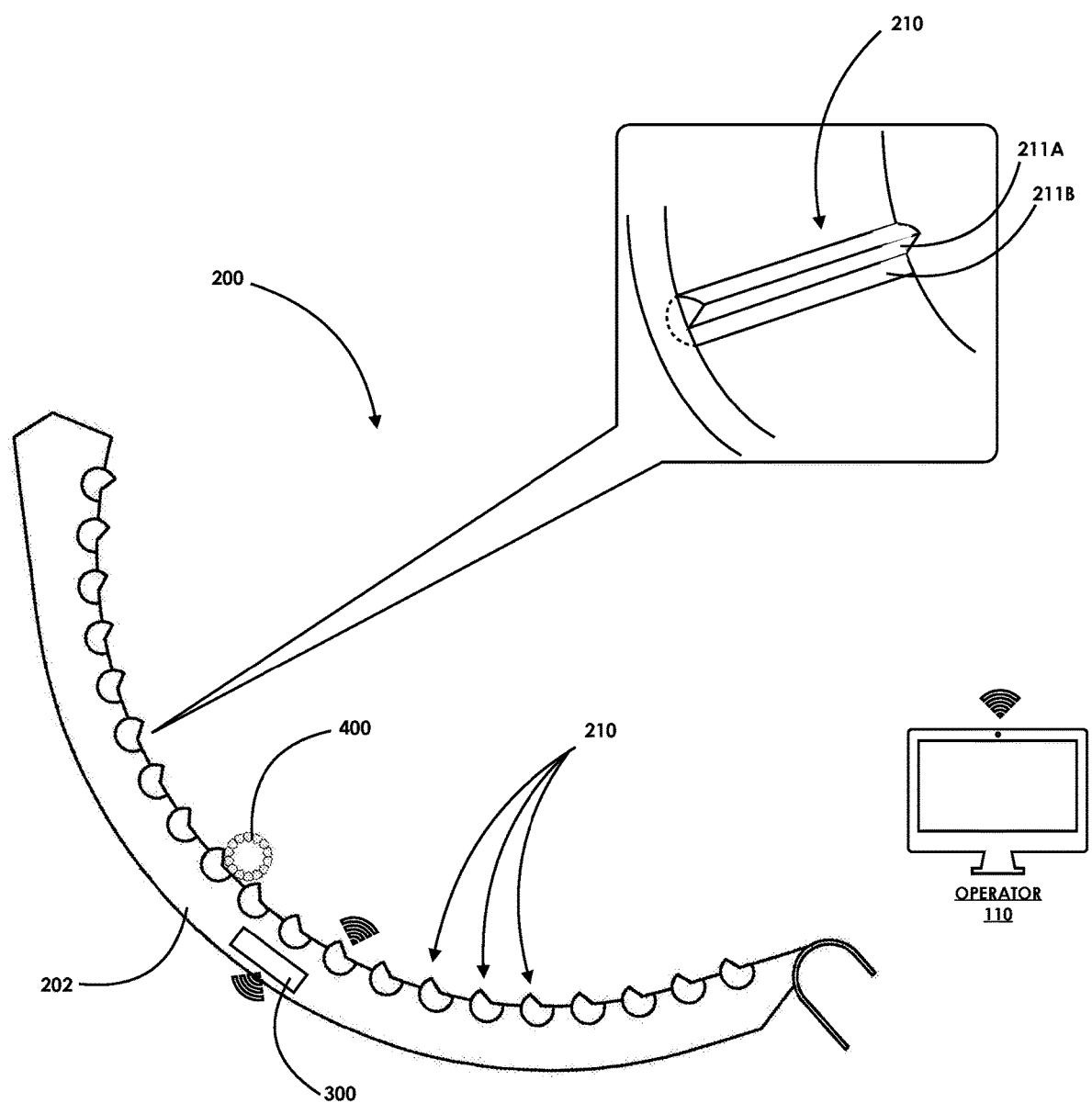
FIG. 1 illustrates a simplified partial cross-sectional view and a perspective view of one non-limiting exemplary embodiment of a dynamically operated concave threshing bar ("DTB") system, method, and apparatus of the disclosure described herein.

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

In one implementation of the disclosure described herein, a display page may include information residing in the computing device's memory, which may be transmitted from the computing device over a network to a central database center and vice versa. The information may be stored in memory at each of the computing device, a data storage resided at the edge of the network, or on the servers at the central database centers. A computing device or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile devices across a network, and may transmit computer files residing in memory. The network, for example, can include the Internet, wireless communication network, or any other network for connecting one or more mobile devices to one or more servers.

Any discussion of a computing or mobile device may also apply to any type of networked device, including but not limited to mobile devices and phones such as cellular phones (e.g., an iPhone®, Android®, Blackberry®, or any "smart phone"), a personal computer, iPad®, tablet computing device, server computer, or laptop computer; personal digital assistants (PDAs) such as a Palm-based device or Windows® CE device; a roaming device, such as a network-connected roaming device; a wireless device such as a wireless email device or other device capable of communicating wireless with a computer network; or any other type of network device that may communicate over a network and handle electronic transactions. Any discussion of any mobile device mentioned may also apply to other devices, such as devices including Bluetooth®, near-field communication (NFC), infrared (IR), and Wi-Fi functionality, among others.

Phrases and terms similar to "software", "application", "app", and "firmware" may include any non-transitory computer readable medium storing thereon a program, which when executed by a computer or computing device, causes the computer or computing device to perform a method, function, or control operation.

Phrases and terms similar "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Such network may also be a local area network (LAN), ethernet network, control area network (CAN), enterprise private network (EPN), personal area network (PAN), metropolitan area network (MAN), wide area network (WAN), global area network (GAN), or virtual private network (VPN), passive optical local area network (PO-LAN), campus area network, storage area network, system area network, satellite networks, and other suitable networks. The network, for example, can include the internet, wireless communication network, or any other network for connecting one or more mobile devices to one or more servers. This includes but is not limited to, standards-based networks, satellite communication networks and wireless local area networks.

Thus, by way of example, and not limitation, computer-readable media can also comprise a network or data links which can be used to carry or store desired program code means in the form of computer-executable instructions or data structures and which can be accessed by a general purpose or special purpose computer.

Phrases and terms similar to "portal" or "terminal" may include an intranet page, internet page, locally residing software or application, mobile device graphical user interface, or digital presentation for a user. The portal may also be any graphical user interface for accessing various modules, features, options, and/or attributes of the disclosure described herein. For example, the portal can be a web page accessed with a web browser, mobile device application, or any application or software residing on a computing device.

FIG. 1 illustrates one non-limiting exemplary embodiment of a concave 200 having a frame 202 and concave bars 210 of a combine harvester of the disclosure described herein, or the dynamically operated concave threshing bar ("DTB") system, apparatus, and method of the disclosure described herein. Here, each concave threshing bar 210 is configured to be disposed in between the side rails of frame 202 of concave 200. As shown, concave bars 210 are positioned and secured to concave frame 200, wherein each bar 210 is configured to move in a curvilinear path or arcuate path in any direction along concave frame 200. As disclosed herein, references to top 211A or bottom 211B faces of the threshing bars 210 may also be interpreted as first or second faces of the threshing bars which come into contact with crop 400, such as corn crop or "ear," to thresh and separate the kernels of the corn cob. In addition, the aforementioned first 211A and second 211B faces of each threshing bar may be at any angle relative to each other or a horizontal plane. Further, threshing bars 210, may also have any configuration or cross-sectional profile, such as having a cut-away, notch, or groove extending along its length, cylindrical round bars (having a round cross-sectional profile) or rectangular bars (having a square cross-sectional profile), or any other symmetrical or asymmetrical configuration or cross-sectional profile.

Figure 2A:
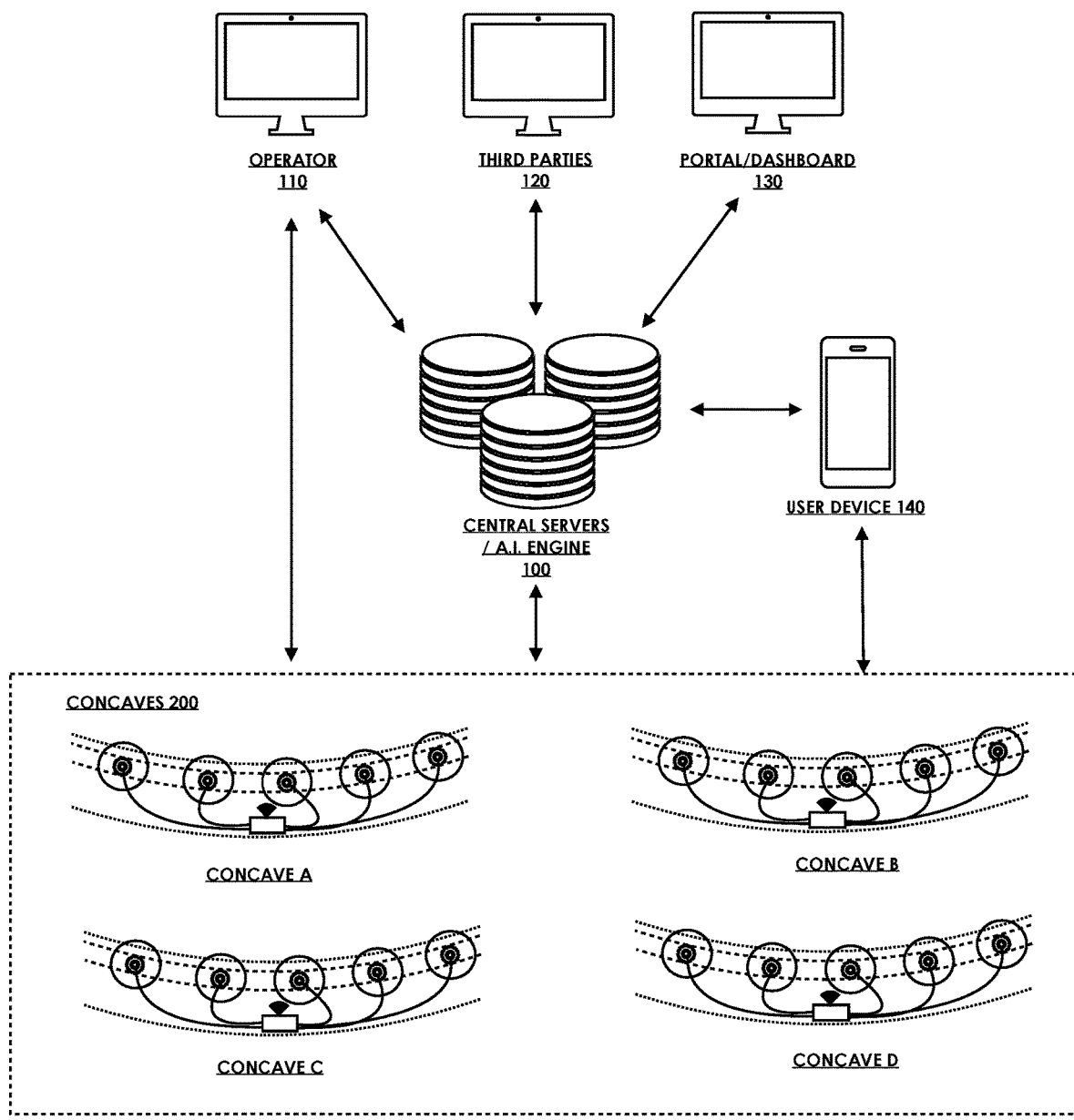
FIG. 2A illustrates a diagram of a general network architecture of one non-limiting exemplary embodiment of the DTB system, method, and apparatus of the disclosure described herein.

FIG. 2A illustrates one non-limiting exemplary embodiment of a network architecture of the DTB system, apparatus, and method of the disclosure described herein. References to a concave 200 here can also include a combine harvester including the concave 200. Specifically, each concave 200 of each combine harvester of the DTB system, which can be multiple concaves (or multiple combine harvesters), such as Concaves A-D (or also referred to as "fleet" of combine harvesters), can communicate bi-directionally via one or more controllers (such as controller 300) or computing devices 300 of each concave 200 with central servers, central computing devices, central database 100, or with a remote or local fleet operator or fleet manager, such as operator 110. Here, controller 300 can further be a computing device. Here, central servers 100 can be comprised of multiple computing device systems that communicate wirelessly or wired via the internet, local intranet, local area network (LAN), control area network (CAN), metropolitan area network (MAN), wide area network (WAN), among others, with one or more concaves 200 of the DTB system of disclosure described herein, controllers 300, with any one or more sensors disposed on the concaves or combine harvesters, or with any other computing devices, actuators, motors, and the like configured to move or operate any one or more of the threshing bars 210 of a concave 200. Further, each concave 200, or each combine harvester of the fleet can also bi-directionally communicate with each other to dynamically adjust or modify certain settings or threshing operations (such as the spacing between each threshing bar) with respect to each concave or combine harvester's data received from one or more sensors on each concave or combine harvester, among others. In addition, each concave 200 or combine harvester of a fleet may automatically receive scheduling data to operate such concaves 200 (and the position of each of its threshing bars 210) based on pre-scheduled operations with respect to each concave or combine harvester of the fleet.

Still referring to FIG. 2A, search central server 100 or controller 300 of the DTB system may include, among others, computer-based methods comprised of sophisticated algorithms, fuzzy logic algorithm, artificial intelligence (AI), automated AI, machine learning algorithm, neural networks, computational neural networks, weighting, certain weights assigned to one or more data associated with crop(s) being threshed or with respect to each concave, computer software, applications, application specific integrated circuits (ASIC), field programmable gate arrays (FGPA), systems on a chip (SoC), computing systems, mathematical models, dynamic modeling, object oriented analysis and design, finite element analysis (FEA) computation, advanced programs, electronic databases, analytical tools and experts in the agricultural, food, weather, environment, technological, actuarial, and manufacturing industries. In addition, the computer based methods, computerized, automated AI system, machine learning, and neural network of the DTB system disclosure described herein may also send or retrieve data from third party sources or other sources such as grain carts, grain bins, grain elevators, grain markets, tractors, utility task vehicles, soil probes, soil systems, satellites, guidance and steering systems, drones, planters, sprayers, service centers, field offices, United States Department of Agriculture, global positioning systems, risk management systems, seed suppliers, agronomist, research systems, chemical suppliers, logistics systems, fertilizer suppliers, pest and disease information, crop insurers, enterprise performance management, heads-up displays, cylinders, solenoids, hydraulic cylinders, hydraulic pumps, electric motors, yield mapping, imagery systems, telematic devices, inventory management, traceability systems, field management systems, field activity systems, enterprise resources planning, enterprise resources management, enterprise asset management systems, document management systems, fleet management systems, labor management systems, time clocks, dealers, technical support, work tickets, work orders, job systems, purchase orders, accounting systems, investor systems, communication systems, advisors, supply chains, contract management systems, custom harvesting systems, lease systems, land owner systems, decision support systems, water management systems, simulation software, predictive modeling systems, arithmetic logic units, benchmark databases, performance databases, performance management logic, instruction analysis logic, performance benchmark logs, performance benchmark generator logic, performance analysis logic, scenario software, precision agriculture systems, dealer management system, weather systems, media oriented systems transport bus, bluetooth systems, cloud storage, sequential circuits, combinational circuits, solid state drives, microprocessors, programmable logic controller, fuzzy logic, central processing unit, flash memory controller, memory management unit, integrated memory controller, memory chip controller, memory controller unit, field network controller, CAN flexible data bus, dynamic memory circuits, random access memory, combinational logic unit, virtual servers, electronic memory circuit, application specific integrated circuits, dynamic random access memory, double data rate synchronous dynamic random-access memory, synchronous dynamic access memory, static random access memory, databases, cloud applications, among others. Specifically, any, all, or any combination of the aforementioned computer-based methods may be used to determine and calculate an optimal position of each threshing bar 210 of the concave with respect to each other and the spacing between each threshing bar 210 to provide optimal threshing efficiency of crop 400 with little to no grain loss or damage. In addition, any of the aforementioned computer-based methods, such as the automated AI system or machine learning of servers 100 or controller 300, may be configured to operate on any network layer, such as based on the Open Systems Interconnection (OSI) Model including one or more of the application layer, presentation layer, session layer, transport layer, network layer, data link layer, and physical layer.

Figure 2B:
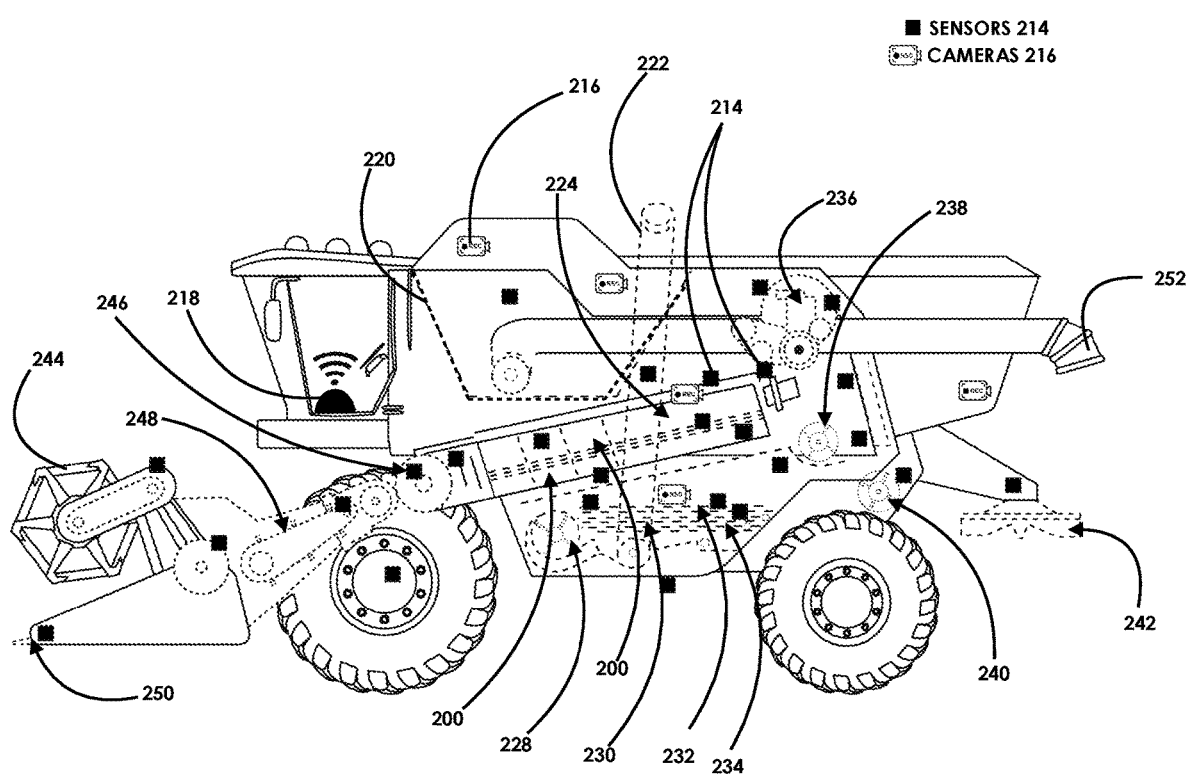
FIG. 2B illustrates a simplified side view of one non-limiting exemplary embodiment of a combine harvester having concaves and sensors of the DTB system, method, apparatus of the disclosure described herein.

In addition, each concave 200 and combine harvester, including threshing bars 210 and frame 202, may include one or more sensors or input devices, such as sensors 214, as shown in FIG. 2B and FIGS. 3A-5C. Further, the combine harvester may also include one or more on-board computing devices 218 for communicating with and transmitting to and receiving data from any of the one or more sensors 214, cameras 216, and the terminals or components of FIG. 2A, including but not limited to operator 110, third parties 120, portal 130, servers 100, device 140, and concaves 200, among others. Specifically, FIG. 2B illustrates one non-limiting exemplary embodiment of a combine harvester having concaves 200 and multiple sensors 214 disposed or positions at various locations in, around, and on the combine harvester and concaves 200 to detect various conditions. Sensors 214 can include but are not to temperatures sensors, humidity sensors, environmental sensors, air pressure sensors, fluid pressure sensors, speed sensors, accelerometer sensors, gyroscopes, object detection sensors, infrared sensors or detectors, among others. Further, locations for such sensors 214 can include but is not limited to, various points underneath the combine, at the sides, rear, front, or top of the combine, at the header, gathering chain, feederhouse, feeding drum, wheels, engine, chassis, concaves, rotor, rotor cage, separation grates, vanes, chaffer, sieve, pre-sieve, fan, beater, chopper, spreader, augers, clean grain elevator, grain tank, among others. Here, the combine of FIG. 2B is shown with grain tank 220, clean grain elevator 222, separator 224, engine 236, beater 238, crop discharge chute 252, spreader 242, chopper 240, cleaning unit 230, chaffer 232, sieves 234, fan 228, cutterbar 250, reel 244, feederhouse 248, and drum 246, among others.

In addition, the combine harvester may also include multiple cameras, such as image or video capturing devices or cameras 216, positioned at various locations to monitor digital images or video of threshing operations of each concave 200 or any part of the combine harvester, such as monitoring the aforementioned parts 200, 210, 220-252, and 300, among others. Such images or video obtained or captured from cameras 216 may also be transmitted and processed by servers 100, operator 110, third parties 120, portal 130, or user devices 140. For example, image or video obtained from cameras 216 may be used to detect errors, malfunctions, grain damage, grain loss, anomalies, among others. Here, such errors can be detected manually via an operator or such as via video image analysis or via the computerized automated AI system of the DTB of the disclosure described herein. Specifically, the computer-based methods or automated AI system of the DTB can capture, stream, transmit, save, and record images or video and/or metadata of the threshed or unthreshed crop from various points of the combine during threshing operations, such as at the elevator or discharge, and compare such captured images or video to prior historical or benchmark images or video of the crop to determine if there is grain loss or grain damage with respect to that specific crop being threshed and automatically adjust the spacing (distance) between the threshing bars of the concave.

For example, the computer implemented method, computerized, automated AI system, machine learning, and neural network of the DTB system, such as servers 100 or controller 300, may have data or various conditions retrieved from third party sources, or receive data or various conditions from sensors in communication with and secured to each concave 200 and various parts of the combine harvester, or sensors positioned at locations in, around, near, or away from each concave 200 that monitor the various conditions. Such various conditions, referred to herein as DTB Conditions, can include, but are not limited to, various conditions. In addition, the computerized, automated AI system, machine learning or neural network of the DTB system may use cameras 216 to analyze grain for foreign material, MOG, unthreshed grain, grain damage, broken grain, broken cobs, fines, dockage, clean grain, sieve loss, shoe loss, among others typically positioned at or near the cleaning operations, clean grain elevator, augers and/or grain tank providing the DTB system with, but not limited to, information about threshing effectiveness and separation effectiveness. The computer implemented method, computerized, automated AI system, machine learning or neural network of the DTB system may use cameras to recognize separator loss, unthreshed grain, broken cobs, straw quality, foreign material MOG, among others typically positioned at or near the separating operations, augers, beater, chopper, spreader and chassis providing the DTB system with, but not limited to, information about threshing effectiveness and separation effectiveness. Such conditions, referred to herein as DTB Conditions, can include, but are not limited to, crop conditions (crop disease, fungi, fungal-like organisms, bacteria, phytoplasmas, viruses, viroids, nematodes, parasites, etc), harvest conditions (sunshine, rainfall, humidity, dew point, wind, atmospheric pressure, evapotranspiration, etc), soil conditions (sandy-clay-loam mixture), crop characteristics (ear size, cob size, straw thickness, straw moisture, etc) crop type (corn, soybeans, wheat, etc), crop variety (manufacturer or hybrid), crop yield (unit of harvested grain per unit of land), crop moisture (moisture of crop), crop test weight (units of pounds per bushel of crop), crop protein (amount or percent of protein per grain), crop starch (amount or percent of starch per grain), crop oil (amount or percent of oil per grain), crop volume (volume per grain), crop grade (grade of crop USDA standards), bulk density (mass of grain per unit of volume), stalk moisture (moisture of plant stalk), leaf moisture (moisture of crop leafage) combine productivity (grain throughput divided by operation cost), engine revolutions per minute (RPM), engine usage (percent of engine capacity being used), horsepower consumption (percent of horsepower being used), fuel consumption (unit of fuel usage per unit of time), concave clearance (distance from rotor to concave), threshing pressure (measure of pressure in threshing operations), rotor speed (rotor revolutions per minute), rotor type (AFX, Specialty, Standard, TriStream, Variable Stream, Small Tube, etc), pinch point (point where concave touches the rotor), threshing angle (pitch, roll and yaw of a concave to the rotor), rotor elements (type and amount of rasp bars on rotor), gear ratio (ratio of gear driving rotor), gear position (gear combine motor is engaged), power band (horsepower produced at a specific engine RPM), sieve loss (amount of grain lost from the sieve), shoe loss (amount of grain lost from the shoe), separator loss (amount of grain lost from separation operations), cleaning loss (amount of grain lost from cleaning operations), separator clearance (distance from rotor to separator grate), grain loss (total amount of grain loss from separating and cleaning operations), grain divider position (position of grain divider), loss sensitivity (sensitivity of sensors that detect grain loss), threshing efficiency (measure of threshing per unit of time), separation efficiency (measure of separation per unit of time), ground speed (combine unit of travel distance per unit of time), elevator speed (speed at which grain is being transported), elevator throughput (amount of grain being processed by the elevator per unit of time), separator pressure (measure of pressure in separating operations), fan speed (speed at which fan is operating), feed accelerator speed (speed at which feed accelerator is operating), cross auger position (position auger is operating), drum speed (speed at which drum is operating), drum position (position drum is operating), paddle speed (speed at which paddle is operating), paddle position (position paddle is operating), auger speed (speed at which auger is operating), feederhouse position (position feederhouse is operating), feederhouse throughput (amount of grain being processed by the feederhouse per unit of time), gathering chain speed (speed at which gathering chain is operating), header speed (speed at which header is operating), header width (cutting width or number of rows of header), header cut height (height at which header is cutting), header angle (pitch and roll measurements of the header), header throughput (amount of crop being processed by the header per unit of time), header loss (amount of grain lost from header), cutting efficiency (measure of crop cut per unit of time), cutter bar position (position cutterbar is operating), cutterbar length (length of cutterbars), deck plate position (position deck plate is operating), stripper plate gap (gap stripper plate is operating), reel speed (speed at which reel is operating), combine angle (pitch and roll measurements of the combine), pre-sieve position (hole diameter and angle of comb pre-sieve is operating), sieve angle (pitch and roll measurements of the sieve), sieve position (hole diameter and angle of comb sieve is operating), chaffer position (hole diameter and angle of comb chaffer is operating), grain distribution (amount and position of grain), grain throughput (amount of grain being processed by combine per unit of time), bushels per hour, tailings (unthreshed grain), clean grain (threshed grain), clean grain foreign material (amount or percent of foreign material in clean grain), grain damage (amount or percent of damaged grain), whole grain (amount or percent of whole grain), grain damage position (location of damaged on grain), broken grain (amount or percent of broken grain), skinned grain (amount or percent of skinned grain), broken grain and foreign material (amount or percent of broken grain and foreign material per unit of volume), broken cobs (amount or percent of broken cobs), stress cracks (amount or percent of stress grain), fines (amount or percent of cracked, split grain), dockage (amount or percent of dockage of grain per unit of volume), straw quality (measure of straw damage), grain tank foreign material (amount of MOG per volume of clean grain in grain tank), grain size (physical size of grain), foreign material (also known as MOG), threshed grain (amount or percent of threshed grain per unit of volume), unthreshed grain (amount or percent of unthreshed grain per unit of volume), grain return (amount or percent of tailings), storability (measure of quality of storability of grain), threshing effectiveness (ratio of threshed grain to unthreshed grain), separation effectiveness (ratio of threshed grain continuing to cleaning operations to threshed grain exiting combine out of rotor), operational or performance parameters (input parameters by operator or AI system the combine is to operate within), operational or performance benchmarks (standards for operating or performance data to be compared to), operational or performance goals (performance goals input by the operator or A system the combine is to optimize by changing various controllers or combine settings), operational or performance priorities (priority or weight of specific targeted goal), operational or performance sensitivity (time of reaction to deviations to performance parameters or goals), weather data, historical data (information from every sensor or metric the combine records, typically store in a database), fleet information (information shared from network or other combine harvesters), global positioning system (GPS) information, harvest data (yield maps from current and previous harvest at a particular GPS location), among others (referred to herein collectively as "DTB Conditions"). Here, any one or more of the aforementioned DTB Conditions can be used advantageously to adjust the amount of modification or adjustment to the positions of the concave bars 210 relative to each other using the controller(s) 300 and actuators 212 of concave 200, among others.

Still referring to FIG. 2A, each concave 200 or combine harvester of the DTB system may also communicate bi-directionally, wirelessly or wired, with an operator terminal 110 or with a user device terminal 140. Here, operator 110 or user device 140 may be any type of computing device that may have one or more software or applications or "apps" residing locally thereon that can operate one or more controllers 300 or actuators 212 of each concave 200. In addition, each operator 110 or user device 140 may also communicate bi-directionally, wired or wirelessly, with central servers 100. In addition, operator 110 or user device 240 may also include one or more, or all, of the aforementioned computer-based methods, such as the automated AI and machine learning systems of the disclosure described herein. The DTB system may also include one or more third party computing systems 120 communicating bi-directionally, wired or wirelessly, with that of central servers 100 or concaves 200. Here, any of the third parties systems or terminals 120 may include various data or information to be used by the aforementioned computer-based methods of the DTB to determine and calculate optimal spacing between threshing bars 210, which can include information or data from any one or more of the aforementioned DTB Conditions.

For example, the DTB system can use any one or more of the DTB Conditions, such as environmental conditions, ambient temperature and humidity, along with crop moisture and crop type to be threshed, such as corn or wheat, to determine that such conditions would require the spacing distance between each bar to be at defined distance for a threshing operation of the concave. In addition, sensors disposed within or near the concave can further dynamically assert other conditions, such as rotor speed, concave clearance, shoe loss, separator loss, grain damage and engine load to dynamically adapt the spacing distance between each threshing bar using the AI or machine learning algorithms of the aforementioned computer-based methods. Specifically, the AI or machine learning can dynamically learn what the most optimal spacing between each other threshing bars of the concave are in real-time and self-correct or self-stabilize itself in real-time during threshing operations. For example, this can be achieved by the AI or machine learning system of the DTB system assigning weights to various parameters that can provide optimal threshing efficiency and spacing between the threshing bars. As an example of the weights, if a particular crop, such as a corn cob or "ear," are present for a threshing operation, then certain weights will be assigned within the algorithm to the processes that increase spacing between the threshing bars as opposed to a crop, such as wheat, are present for a threshing operation which may require decreasing the spacing between the bars. Similarly, any of the aforementioned DTB Conditions may also be used in combination with any other DTB condition before or during threshing operations.

Figure 3A:
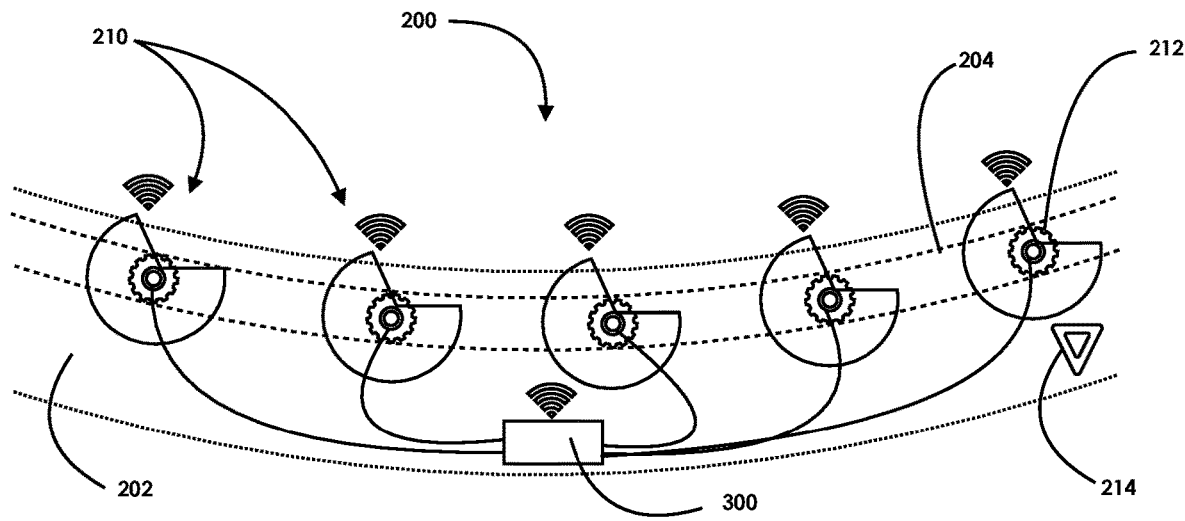
FIG. 3A illustrates a partial cross-sectional side view of one non-limiting exemplary embodiment of a concave of the DTB system, method, and apparatus of the disclosure described herein.
Figure 3B:
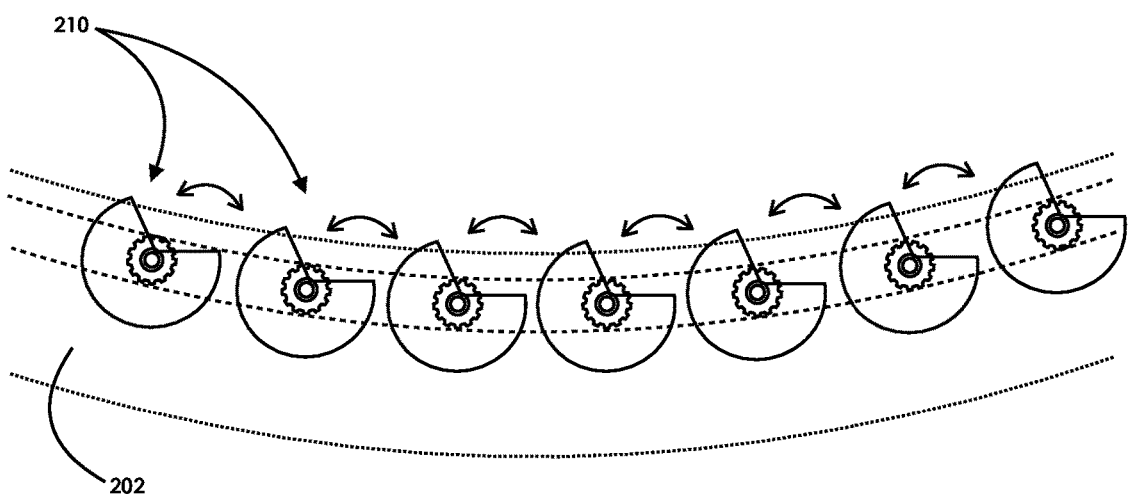
FIG. 3B illustrates a partial cross-sectional side view of another non-limiting exemplary embodiment of a concave of the DTB system, method, and apparatus of the disclosure described herein.
Figure 3C:
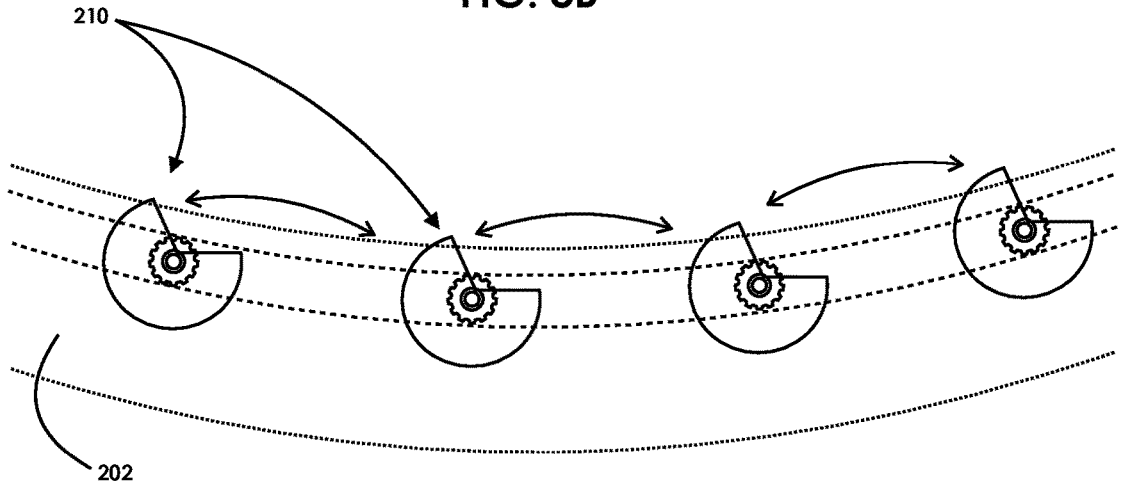
FIG. 3C illustrates a partial cross-sectional side view of another non-limiting exemplary embodiment of a concave of the DTB system, method, and apparatus of the disclosure described herein.

FIGS. 3A-3C illustrate various non-limiting exemplary embodiments of the DTB system, method, and apparatus of the disclosure described herein, shown with threshing bars having a first and second threshing face, or a cut-away, channel, or groove extending along the length of each bar 210. Here, the first 211A and second 211B threshing faces of threshing bar 210 may be positioned at any angle relative to each other ranging from 90-degrees up to 180 degrees and each of the first and second faces may also have any length or surface area that is equal to, greater, or less than each other. Alternatively, each first or second face may have an angle ranging from about 1-degree up to about 45-degrees relative to a horizontal plane. FIG. 3A illustrates concave 200 of the DTB system, method, and apparatus of the disclosure described herein shown with a concave frame 202 and a plurality of threshing bars 210 secured thereto. In addition, frame 202 further includes a pair of side rails or tracks 204 having a curvilinear or arcuate configuration disposed on the interior side walls of frame 202, wherein the tracks 204 oppose and face each other within frame 202. Here, each track 204 is configured to receive therein mechanical motorized actuators 212 having gears, rollers, motor, or wheels secured thereto. Specifically, each threshing bar 210 has at least one actuator 212 disposed at both ends of the threshing bar 210. As discussed, each actuator 212 includes wheels, rollers, gears configured to engage each track 204 of frame 202 such that each threshing bar 210 may independently move along tracks 204 in any direction. In particular, each actuator 212 may be driven or operated by any type of motor, such as any one or more of the following: electric motor, DC motor, brush motor, brushless motor, AC brushless motor, DC brushless motor, direct drive, linear motor, servo motors, stepper motor, variable speed motor, internal combustion motor, hydraulic based motor, among others. In addition, each actuator 212 may operate based on its on propulsion via any one or more of the aforementioned motors. Alternatively, each actuator 212 may further be connected to any type of the foregoing motors via one or more drive shafts and driven or propelled via the one or more drive shafts and gears in communication with one or more motors. In the alternative, each actuator 212 may further be connected to a transmission system having one or more gear ratios wherein the DTB system (such as via controller 300 and computer implemented method or AI system) can manually, selectively, or automatically select appropriate gears for initiating movement and propelling each actuator in connection with each threshing bar.

Further, each concave 200 further includes a computing device or controller 300 configured to send and receive commands, wired or wirelessly, from each actuator 212 of each threshing bar 210. In addition, each actuator 212 may communicate bidirectionally, wired or wirelessly, with controller 300. In addition, controller 300 may also communicate bidirectionally, wired or wirelessly, with sensors 214 disposed in or around frame 202 or secured to frame 202, wherein sensors 214 can detect any of the one or more DTB Conditions. For example, controller 300 may receive commands or operations from central servers 100, operator 110, user device 140, sensors 214, or conduct operations based on AI system or machine learning algorithms, software, or applications residing thereon to execute operations which would send commands or signals to each actuator 212 to rotate its gears or wheels clockwise or counter-clockwise in order to move each threshing bar 210 in a desired path, motion, direction, or speed.

For example, as shown with respect to FIG. 3B, controller 300 (not shown) may send operations to actuators 212 to move each threshing bar 210 closer to each other thereby reducing the spacing or gap between each threshing bar 210, such as when concave 200 is threshing a specific crop or based any of the one or more aforementioned DTB Conditions. In another embodiment, as shown in FIG. 3C, controller 300 (not shown) may send operations to actuators 212 to move each threshing bar 210 farther away from each other thereby increasing the spacing or gap between each threshing bar 210, such as when concave 200 is threshing a specific crop or based any of the one or more aforementioned DTB Conditions.

Figure 4A:
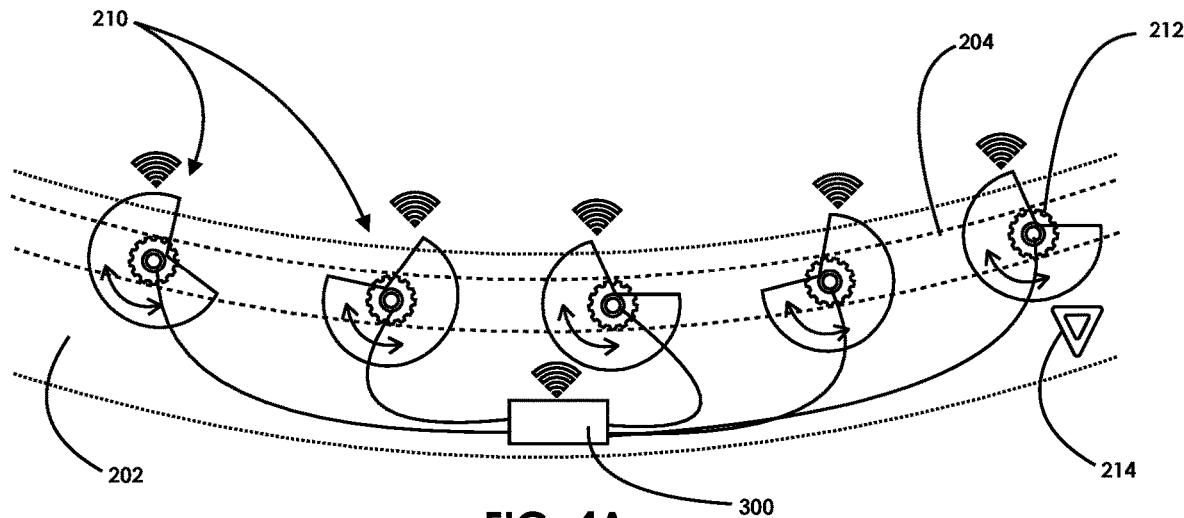
FIG. 4A illustrates a partial cross-sectional side view of another non-limiting exemplary embodiment of a concave of the DTB system, method, and apparatus of the disclosure described herein.
Figure 4B:
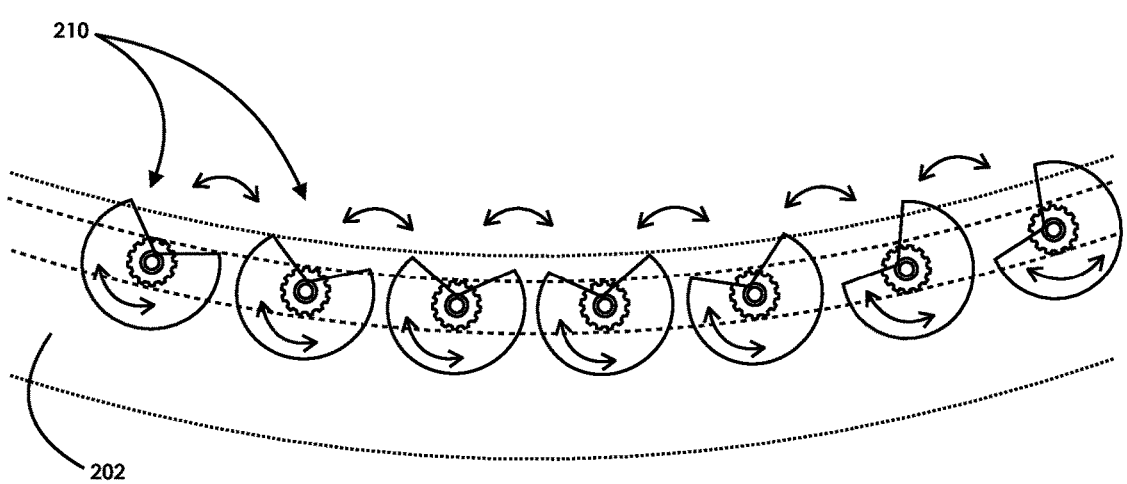
FIG. 4B illustrates a partial cross-sectional side view of another non-limiting exemplary embodiment of a concave of the DTB system, method, and apparatus of the disclosure described herein.
Figure 4C:
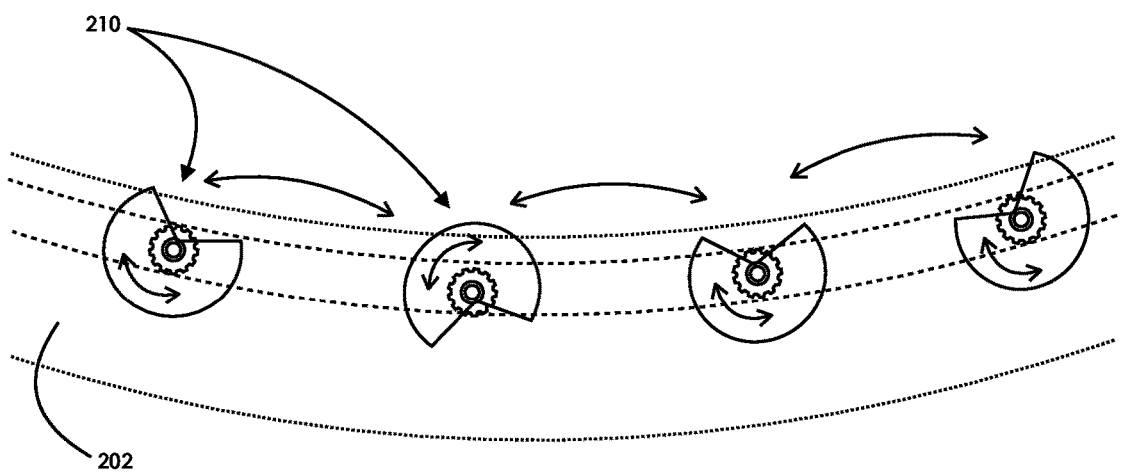
FIG. 4C illustrates a partial cross-sectional side view of another non-limiting exemplary embodiment of a concave of the DTB system, method, and apparatus of the disclosure described herein.

FIGS. 4A-4C illustrate various non-limiting exemplary embodiment of the DTB system, method, and apparatus of the disclosure described herein, shown with threshing bars having a first and second threshing face, or a cut-away, channel, or groove extending along the length of each bar 210. Here, the first 211A (FIG. 1) and second 211B (FIG. 1) threshing faces of threshing bar 210 may be positioned at any angle relative to each other ranging from 90-degrees up to 180-degrees and each of the first and second faces may also have any length or surface area that is equal to, greater, or less than each other. Alternatively, each first or second face may have an angle ranging from about 1-degree up to about 45-degrees relative to a horizontal plane. Here, controller 300 may also send commands or operations to each actuator 212 to lock the its gears or wheels or send rotational mechanical force via differential, such that each of the threshing bars 210 rotate in place to any desired orientation or angle in a 360-degree space. As shown with respect to FIGS. 4B and 4C, this aforementioned rotational capability of each actuator 212 and threshing bars 210 may also be in conjunction with controller 300 (not shown) sending operations or commands to each actuator 212 of bars 210 to also actuate the wheels or gears of actuator 212 to move bars 210 to any desired position along tracks 204, either independently of the rotational capability or in conjunction with the rotational capability in the 360-degree space to any orientation. Here, each bar 210 may rotate anywhere from 1-degree up to 360-degrees, either in a clockwise or counter-clockwise motion. For example, FIG. 4B illustrates each of the bars 210 in a specified rotated orientation and close to each other with very little space or gap in between them, whereas FIG. 4C illustrates bars 210 having another orientation and spaced further apart from each other. In addition, controller 300 may also communicate bidirectionally, wired or wirelessly, with sensors 214 disposed in or around frame 202 or secured to frame 202, wherein sensors 214 can detect any of the one or more DTB Conditions and send any detected sensor data of the DTB Conditions to controller 300.

Figure 5A:
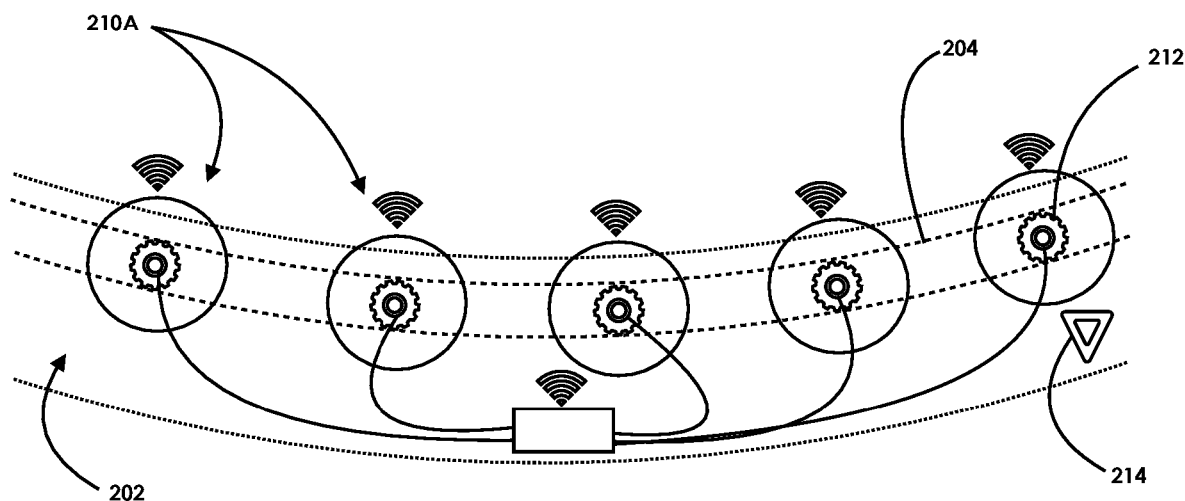
FIG. 5A illustrates a partial cross-sectional side view of another non-limiting exemplary embodiment of a concave of the DTB system, method, and apparatus of the disclosure described herein.
Figure 5B:
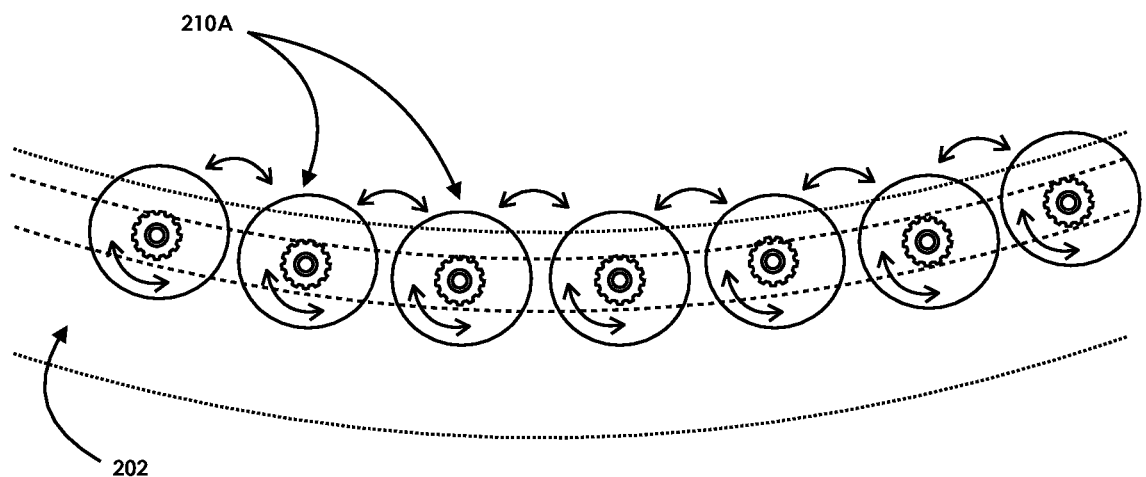
FIG. 5B illustrates a partial cross-sectional side view of another non-limiting exemplary embodiment of a concave of the DTB system, method, and apparatus of the disclosure described herein.
Figure 5C:
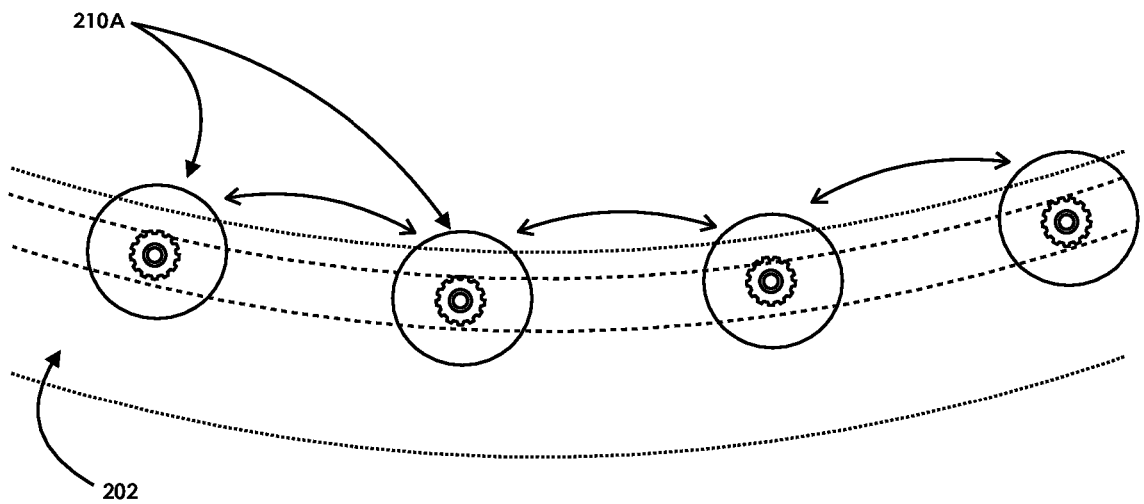
FIG. 5C illustrates a partial cross-sectional side view of another non-limiting exemplary embodiment of a concave of the DTB system, method, and apparatus of the disclosure described herein.
Figure 6A:
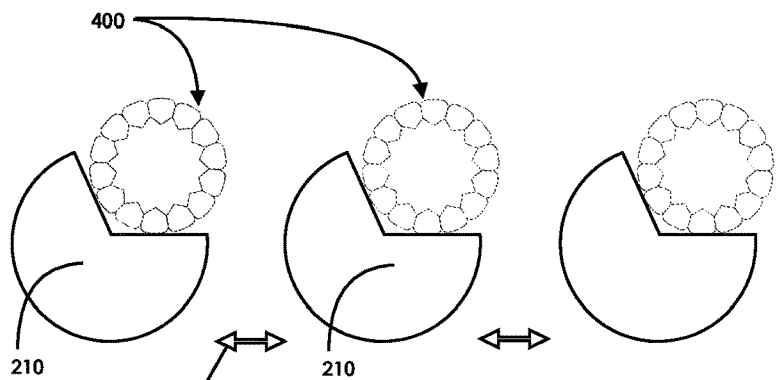
FIG. 6A illustrates a partial cross-sectional side view of one non-limiting exemplary embodiment of threshing bars for a method of operation of the DTB system, method, and apparatus of the disclosure described herein, illustrating the threshing bars and a type of crop.
Figure 6B:
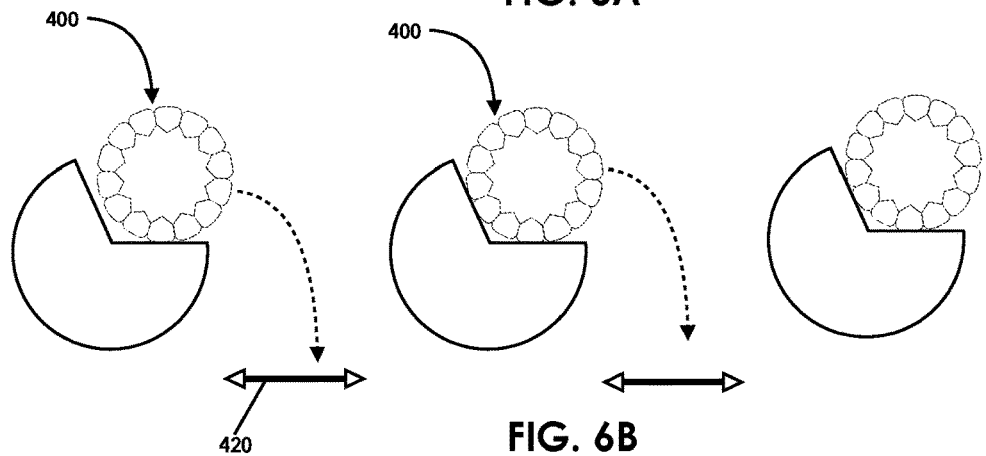
FIG. 6B illustrates a partial cross-sectional side view of another non-limiting exemplary embodiment of threshing bars for a method of operation of the DTB system, method, and apparatus of the disclosure described herein, illustrating the threshing bars and a type of crop.
Figure 6C:
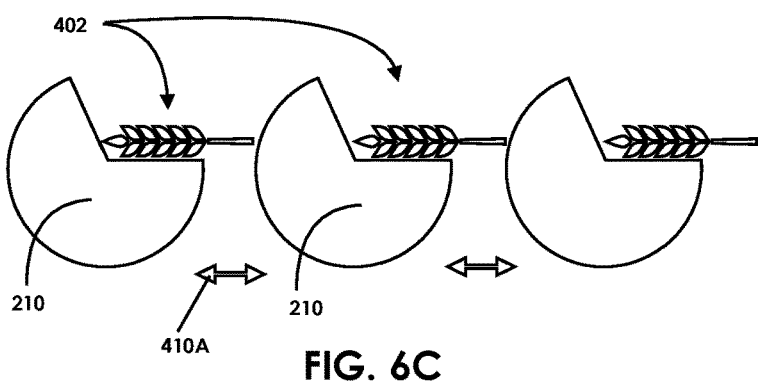
FIG. 6C illustrates a partial cross-sectional side view of another non-limiting exemplary embodiment of threshing bars for a method of operation of the DTB system, method, and apparatus of the disclosure described herein, illustrating the threshing bars and a type of crop.
Figure 6D:
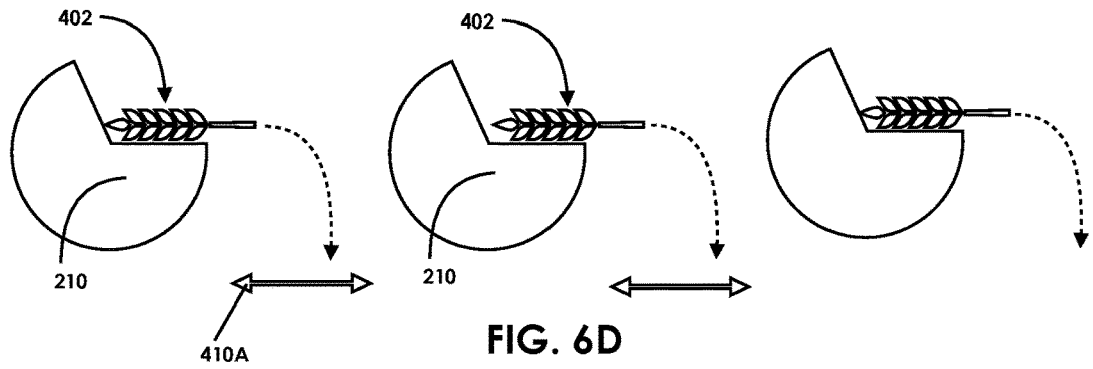
FIG. 6D illustrates a partial cross-sectional side view of another non-limiting exemplary embodiment of threshing bars for a method of operation of the DTB system, method, and apparatus of the disclosure described herein, illustrating the threshing bars and a type of crop.
Figure 7A:
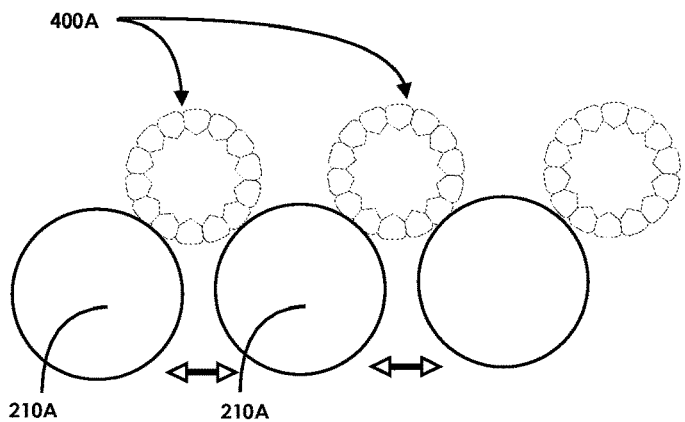
FIG. 7A illustrates a partial cross-sectional side view of another non-limiting exemplary embodiment of threshing bars for a method of operation of the DTB system, method, and apparatus of the disclosure described herein, illustrating the threshing bars and a type of crop.
Figure 7B:
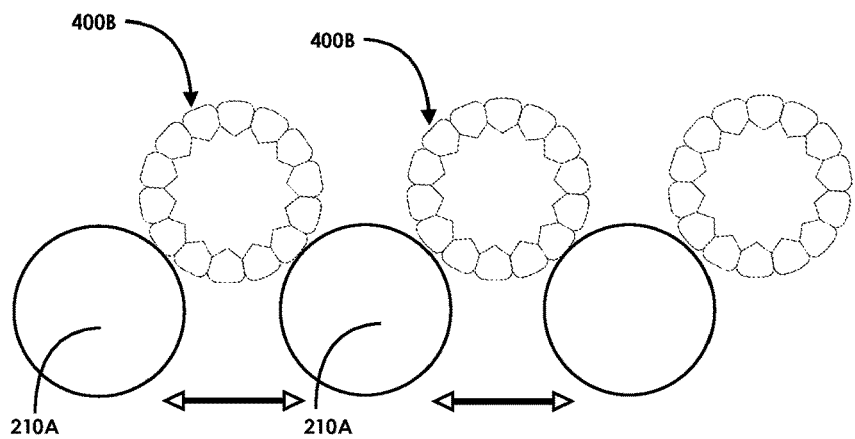
FIG. 7B illustrates a partial cross-sectional side view of another non-limiting exemplary embodiment of threshing bars for a method of operation of the DTB system, method, and apparatus of the disclosure described herein, illustrating the threshing bars and a type of crop.
Figure 7C:
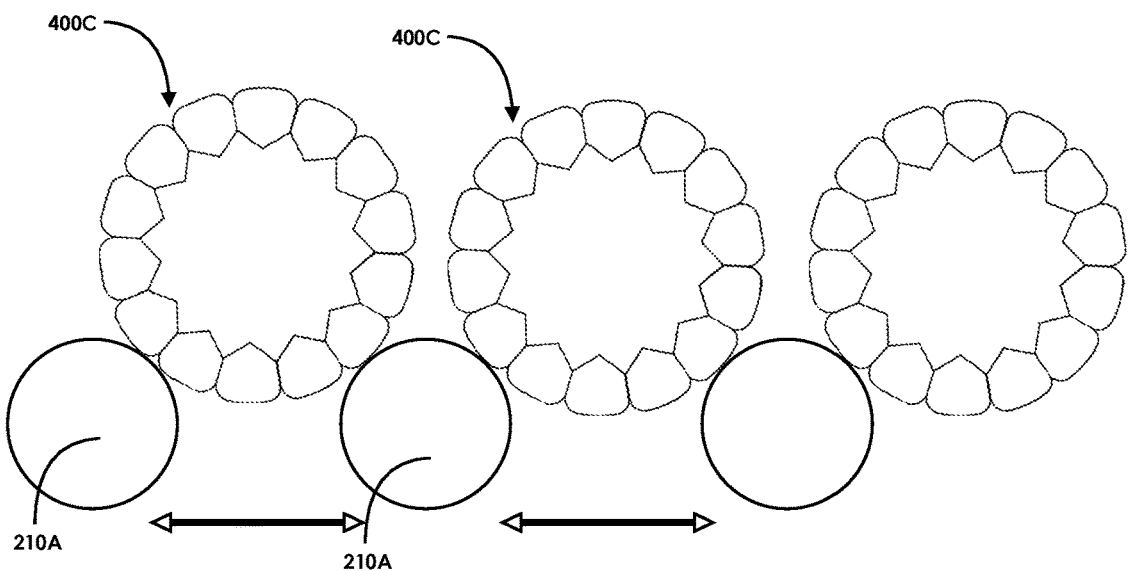
FIG. 7C illustrates a partial cross-sectional side view of another non-limiting exemplary embodiment of threshing bars for a method of operation of the DTB system, method, and apparatus of the disclosure described herein, illustrating the threshing bars and a type of crop.

FIGS. 5A-5C illustrate various non-limiting exemplary embodiments of the DTB system, method, and apparatus of the disclosure described herein, shown with threshing bars having a cylindrical or round cross-sectional profile. Here, the diameter or size of the round cross-section profile of each bar 210A may be of any size and each cylindrical bar 210A have any surface area. FIG. 5A illustrates concave 200 of the DTB system, method, and apparatus of the disclosure described herein shown with a concave frame 202 and a plurality of threshing bars 210A secured thereto. In addition, frame 202 further includes a pair of side rails or tracks 204 having a curvilinear configuration disposed on the interior side walls of frame 202, wherein the tracks 204 oppose and face each other within frame 202. Here, each track 204 is configured to receive therein mechanical motorized actuators 212 having gears, rollers, or wheels secured thereto. Specifically, each threshing bar 210A has at least one actuator 212 disposed at both ends of the threshing bar 210A. As discussed, each actuator 212 includes wheels, rollers, gears configured to engage each track 204 of frame 202 such that each threshing bar 210 may independently move along tracks 204 in any direction. Further, each concave 200 further includes a computing device or controller 300 configured to send and receive commands, wired or wirelessly, from each actuator 212 of each threshing bar 210A. In addition, each actuator 212 may communicate bidirectionally, wired or wirelessly, with controller 300. For example, controller 300 may receive commands or operations from central servers 100, operator 110, user device 140, or conduction operations based on AI system or machine learning algorithms, software, or applications residing thereon to execute operations which would send commands or signals to each actuator 212 to rotate its gears or wheels clockwise or counter-clockwise in order to move each threshing bar 210A in a desired path, motion, direction, or speed. In addition, controller 300 may also communicate bidirectionally, wired or wirelessly, with sensors 214 disposed in or around frame 202 or secured to frame 202, wherein sensors 214 can detect any of the one or more DTB Conditions and send any detected sensor data of the DTB Conditions to controller 300.

For example, as shown with respect to FIG. 5B, controller 300 (not shown) may send operations to actuators 212 to move each threshing bar 210 closer to each other thereby reducing the spacing or gap between each threshing bar 210, such as when concave 200 is threshing a specific crop or based any of the one or more aforementioned DTB Conditions. In addition, controller 300 may also send commands or operations to each actuator 212 of bars 210A to rotate each of bars 210A in place in a 360-degree space. In another embodiment, as shown in FIG. 5C, controller 300 (not shown) may send operations to actuators 212 to move each threshing bar 210A farther away from each other thereby increasing the spacing or gap between each threshing bar 210, such as when concave 200 is threshing a specific crop or based any of the one or more aforementioned DTB Conditions, including rotating to any orientation in a 360-degree space, in a clock-wise or counter-clockwise motion.

FIGS. 6A-6D illustrate various non-limiting exemplary embodiments of each bar 210 of the DTB system, method, and apparatus of the disclosure described herein in a desire orientation depending on the type of crop 400 being threshed by threshing bars 210 and concave 200. For example, as shown with respect to FIGS. 6A-6B, an "ear" or corn or corn cob crop 400 (and its inherent properties), in combination with any of the one or more aforementioned DTB Conditions, may require an operator or controller 300 to set a certain defined spacing 410, such as a spacing length or distance in the range of about 15 mm to about 32 mm (or dynamically determined spacing) between each of the bars 210 that is narrow and prevents crop 400 from falling in between bars 210 during threshing operations, as opposed to a larger spacing 420 which would allow crop 400 to fall in between the bars 210 and reducing the threshing efficiency of the concave. Similarly, as shown with respect to FIGS. 6C-6D, a crop such as wheat stalks 402 (and its inherent properties), in combination with any of the one or more aforementioned DTB Conditions, may require another predefined spacing 410A between each of the bars 210 that is narrow and prevents crop 402 from falling in between bars 210 during threshing operations, as opposed to a larger spacing 420A which would allow crop 402 to fall in between the bars 210 and reducing the threshing efficiency of the concave.

FIGS. 7A-7D illustrate various non-limiting exemplary embodiments of each bar 210 of the DTB system, method, and apparatus of the disclosure described herein in a desire orientation depending on the size of the crops 400A-400C being threshed by threshing bars 210 and concave 200. For example, as shown with respect to FIGS. 7A-7C, an "ear" or corn or corn cob crop (and its inherent properties) may be of any size, such as crop 400A being of small size, crop 400B being of medium, or crop 400C being of large size. Accordingly, the spacing between each bar 210A (or bars 210) of concave 200 may need to be adjusted relative to each other in order for it efficiently thresh each of crops 400A-400C and their respective sizes. Specifically, in combination with any of the one or more aforementioned DTB Conditions, an operator or controller 300 may set a certain defined spacing 410, such as a spacing length or distance in the range of about 15 mm to about 32 mm (or dynamically determined spacing) between each of the bars 210 that is specific to the size of any of crops 400A-400C being threshed by bars 210A (or bars 210) of concave 200 to achieve optimal threshing efficiency with little to no grain loss or damage.

Figure 8A:
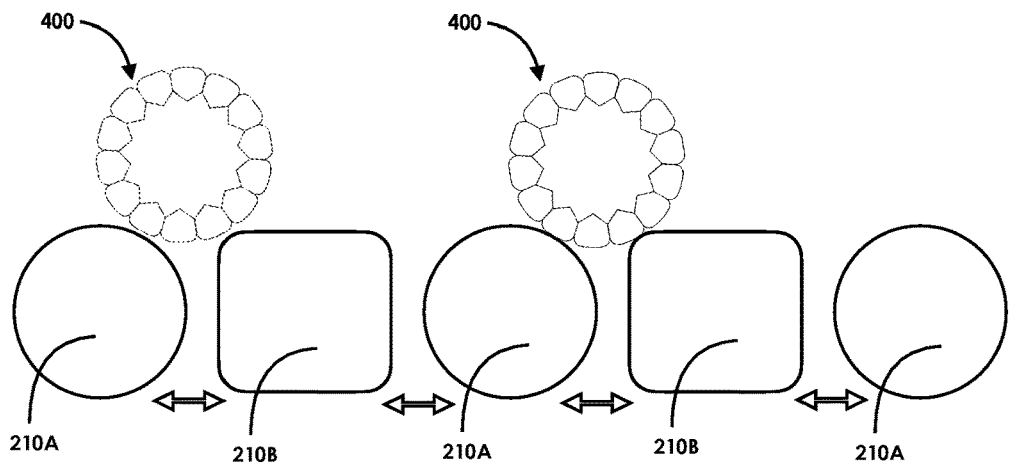
FIG. 8A illustrates a partial cross-sectional side view of another non-limiting exemplary embodiment of threshing bars for a method of operation of the DTB system, method, and apparatus of the disclosure described herein, illustrating the threshing bars and a type of crop.
Figure 8B:
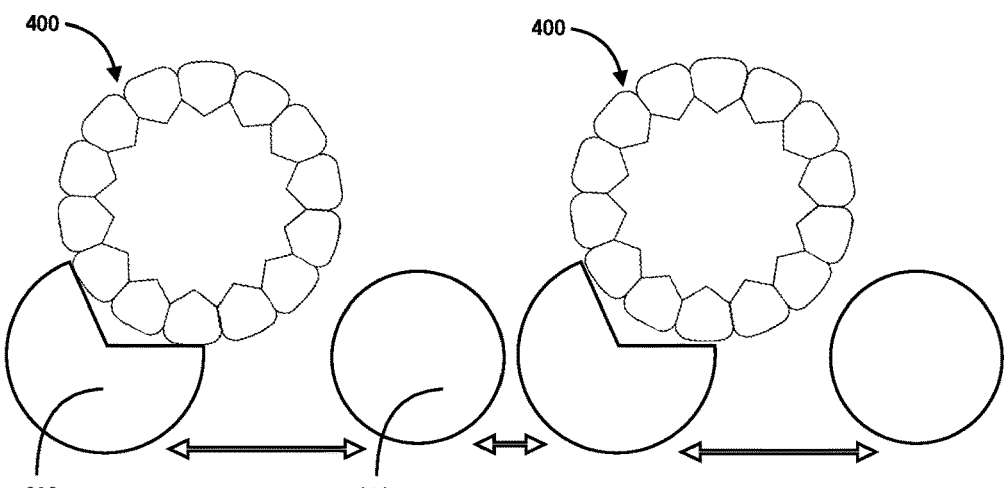
FIG. 8B illustrates a partial cross-sectional side view of another non-limiting exemplary embodiment of threshing bars for a method of operation of the DTB system, method, and apparatus of the disclosure described herein, illustrating the threshing bars and a type of crop.
Figure 8C:
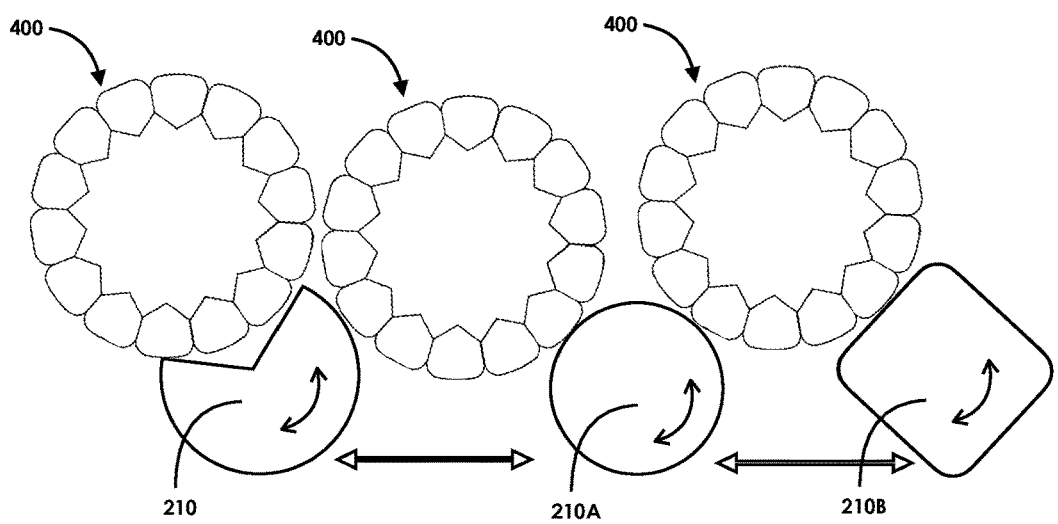
FIG. 8C illustrates a partial cross-sectional side view of another non-limiting exemplary embodiment of threshing bars for a method of operation of the DTB system, method, and apparatus of the disclosure described herein, illustrating the threshing bars and a type of crop.

FIGS. 8A-8C illustrate various non-limiting exemplary embodiments of the DTB system, method, and apparatus of the disclosure described herein having threshing bars of varying configurations, orientations, and spacing within a concave 200. Specifically, as shown with respect to the embodiment of FIG. 8A, concave 200 and frame 202 (not shown) may also include threshing bars 210A having a round cross-sectional profile and threshing bars 210B having a square cross-section profile positioned relative to each other within frame 202 and spaced at a defined narrow spacing (or dynamically determined spacing). As shown with respect to the embodiment of FIG. 8B, concave 200 and frame 202 (not shown) may also include threshing bars 210 having a first and second threshing face at an angle relative to each other and threshing bars 210A having a round cross-sectional profile positioned relative to each other within frame 202 and spaced both larger and smaller spacings, as shown, relative to each other depending on crop 400 or any of the one or more DTB Conditions. As shown with respect to the embodiment of FIG. 8C, concave 200 and frame 202 (not shown) may also include threshing bars 210 having a first and second threshing face at an angle relative to each other, threshing bars 210A having a round cross-sectional profile, and threshing bars 210B having a square cross-sectional profile positioned relative to each other within frame 202 and spaced relative to each other depending on crop 400 or any of the one or more DTB Conditions. In addition, as shown with respect to FIG. 8C, any of bars 210, 210A, or 210B may also rotate to any orientation in a 360-degree space or plane. It contemplated within the scope of the present disclosure described herein, that any of bars 210, 210A, and 210B with respect to FIGS. 8A-8C can operate in conjunction with controller 300 (not shown), actuators 212 (not shown), and tracks 204 (not shown), or frame 202 (not shown) of concave 200.

Figure 9A:
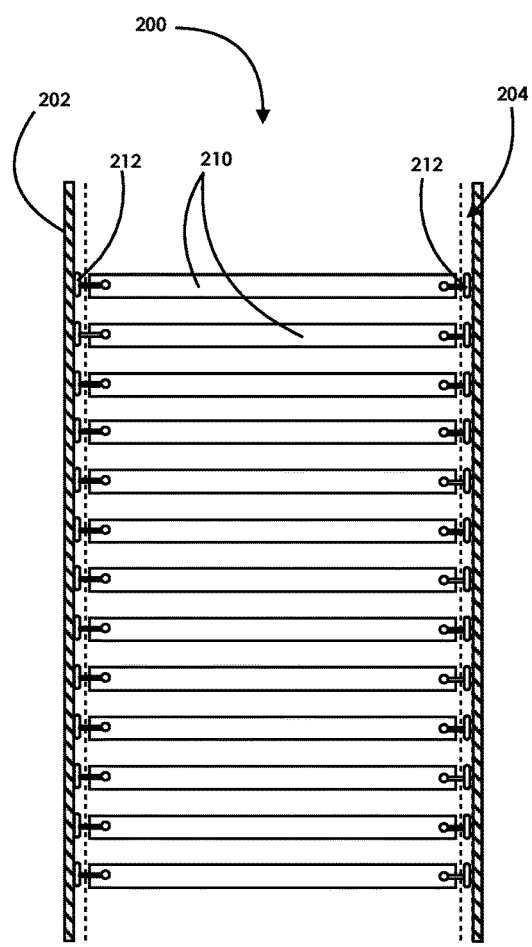
FIG. 9A illustrates a partial top view for one non-limiting exemplary embodiment of threshing bars in a concave of the DTB system, method, and apparatus.
Figure 9B:
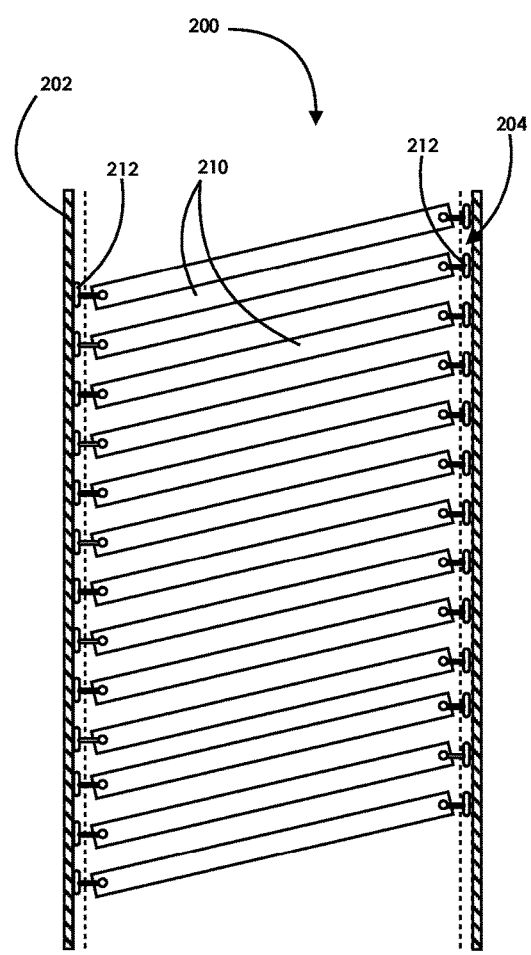
FIG. 9B illustrates a partial top view for one non-limiting exemplary embodiment of threshing bars in a concave of the DTB system, method, and apparatus, wherein the threshing bars are moved into a diagonal configuration.

FIGS. 9A-9B illustrate one non-limiting embodiment of the DTB system, method, and apparatus further configured to move threshing bars 210 from a horizontal or straight configuration as shown in FIG. 9A (i.e., bars 210 perpendicular to the side rails of the concave frame as viewed from the top or bottom) to a diagonal or offset configuration as shown in FIG. 9B. As shown in FIGS. 9A-9B, bars 210 are disposed between the arcuate side rails of concave frame 202 having tracks 204 with actuators 212 which can pivot or rotate relative to each threshing bar, or each threshing bar configured to pivot relative to each of its actuators. Specifically, each actuator 212 may be connected to an arm or drive shaft (which can also extend and retract) that further connects to each threshing bar 210, wherein the actuator, arm, or drive shaft is hinged or pivots relative each threshing bar 210. Moreover, the diagonal orientation of threshing bars 212 may also be achieved via the computer-implemented method, computerized, and AI system of the disclosure described herein based any one or more of the DTB Conditions.

Figure 10:
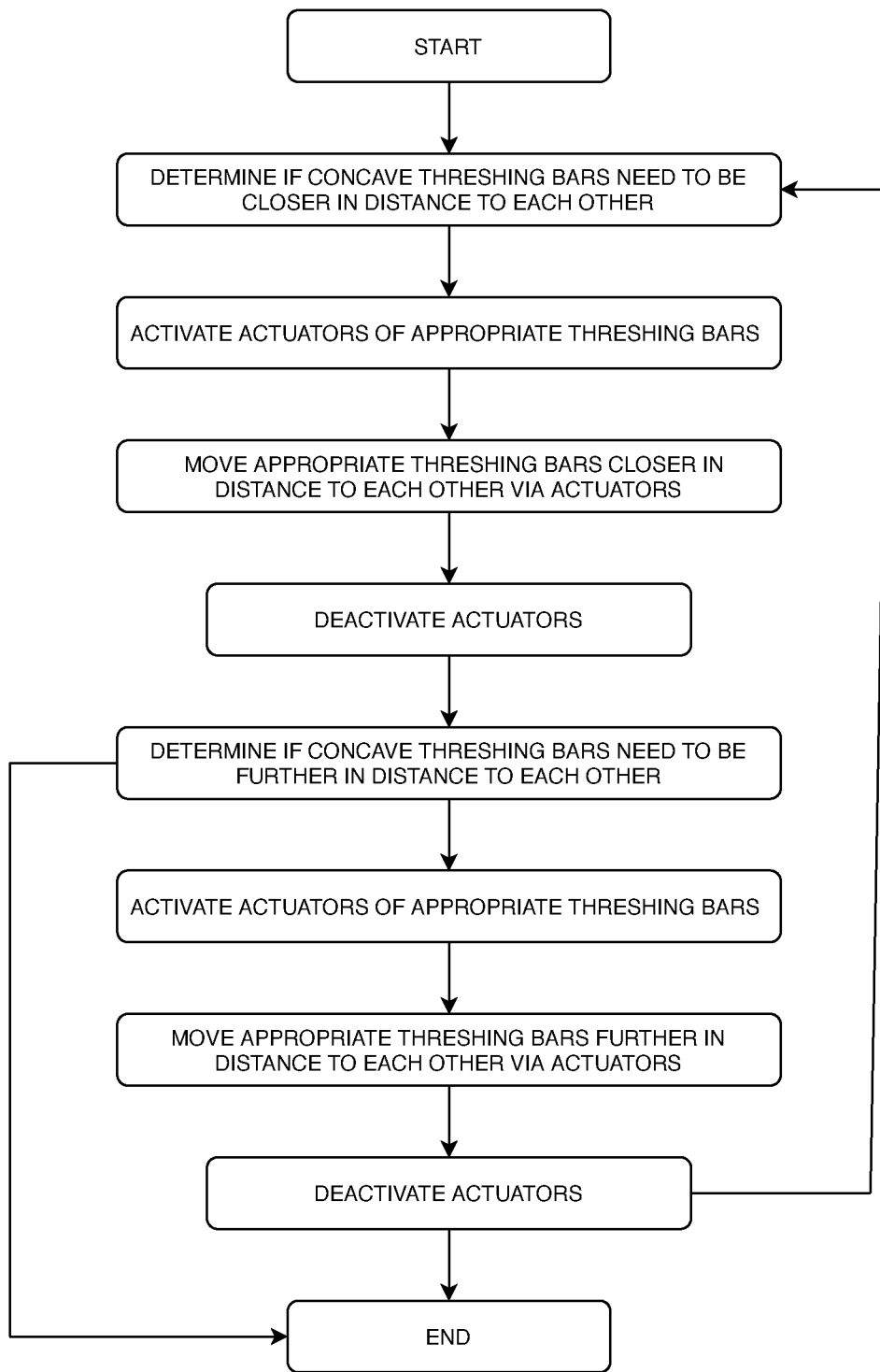
FIG. 10 illustrates a block diagram of a process flow for one non-limiting exemplary embodiment of a method of operation for the DTB, system, method, and apparatus of the disclosure described herein.

FIG. 10 illustrates one non-limiting exemplary embodiment of a process flow chart of a method of operation of the DTB system, method, and apparatus of the disclosure described herein. Specifically, the DTB system or controller 300, may begin the process by determining if the concave threshing bars need to be closer in distance to each other. And if so, next the process will activate the actuators of appropriate threshing bars to move to a desired position within the concave frame assembly. Next, the process will initiate or send commands to the actuators of appropriate threshing bars to decrease the distance of appropriate threshing bars relative to each other. Next, the process can deactivate the actuators. Next, the process will determine if the concave threshing bars need to be further in distance to each other. Here, if the process determines that the threshing bars are in their desired position, then the process will end. Otherwise, the process will proceed to activate the actuators of appropriate threshing bars to move appropriate threshing bars to their desired position. Next, the process will initiate or send commands to the actuators of appropriate threshing bars to increase the distance of appropriate threshing bars relative to each other. Next, the process will deactivate the actuators. Here, the process can automatically repeat itself (or cycle) until the desired positions of each of the threshing bars is achieved and the process ends.

Figure 11:
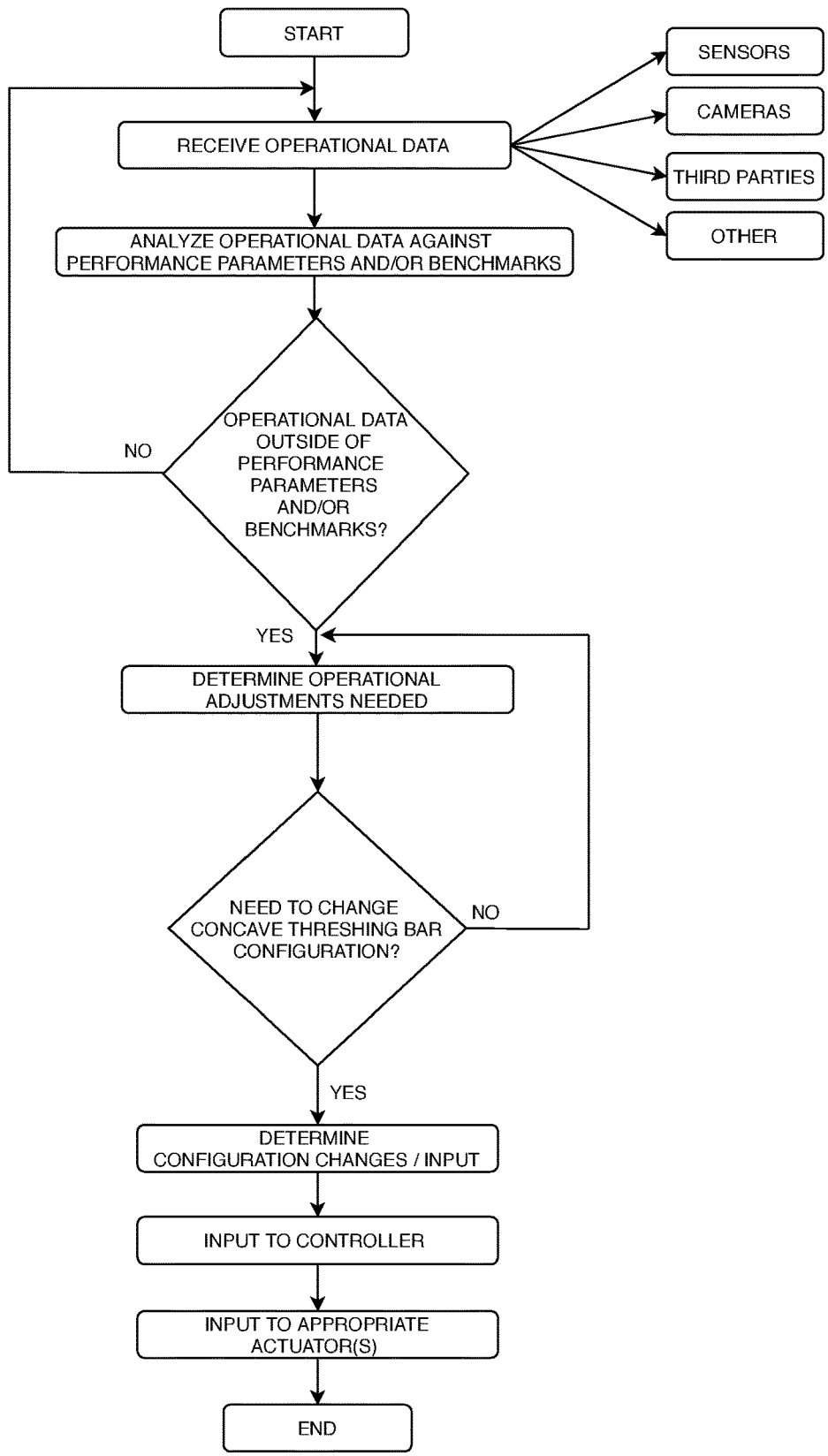
FIG. 11 illustrates a block diagram of a process flow for another non-limiting exemplary embodiment for the DTB, system, method, and apparatus of the disclosure described herein.

FIG. 11 illustrates another non-limiting exemplary embodiment of a process flow chart of a method of operation of the DTB system, method, and apparatus of the disclosure described herein. Here, the process for the computerized or automated AI system of the DTB system can begin by receiving operational data with respect threshing operations of the concave and combine harvester. Here, the operational data can be received from the one or more sensors and/or cameras on the concave or combine harvester, third parties, central servers, operator(s), user device(s), or any other sources. Next, the process can analyze the operational data relative to performance parameters, benchmarks, goals or historical data. Next, the process can determine if the received operational data is out of the performance parameters, benchmarks, goals or historical data. Specific performance parameters, benchmarks or goals include, but is not limited to Maximizing the following: the combine's grain throughput, ground speed, threshing effectiveness, threshing efficiency, separation effectiveness, separation efficiency, bushels per hour, threshing pressure, separator pressure, clean grain, power band, combine's productivity, straw quality, storability, whole grain, among others; or Minimizing the following: broken cobs, broken grain, skinned grain, stress cracks, MOG, grain damage, fines, foreign material in grain tank, grain loss, shoe loss, separation loss, grain return, unthreshed grain, fuel consumption, dockage, among others. Furthermore, specific performance parameters, benchmarks or goals are not mutually exclusive and can be prioritize or weighted. If no, then the process will execute a loop function to continue to receive operational data. If the operational data is not outside of the performance parameters, benchmarks, goals or historical data, then the process will proceed to determining if any operational adjustments are needed. Such operation adjustments can include determining if a change is needed to the configuration, position, or spacing of the threshing bars relative to each other within the concave. Here, if not change is needed to the threshing bar configuration, position, or spacing, then the process will execute a loop function to again determine if operational data needs adjustments. If the process does determine that the concave threshing bar configuration, position, or spacing needs adjustment, then the process will proceed to determine changes needed (such as offsets, tolerances, positions, distances, etc.) and the specific values and parameters for such changes. Once the changes and their associated parameters or value data is determined, then the parameter or value data is then transmitted or inputted to the controller of the concave to operate or send commands to the appropriate one or more actuators for each threshing bar of the concave to adjust, move, or stop motor operations, among others. The computerized or automated AI system of the DTB system can adjust sensor sensitivity's that change how sensitive the sensors are to various conditions, parameters, benchmarks, goals or metrics. In addition, the computerized or automated AI system of the DTB system can adjust reaction sensitivity that change how quickly the computerized or automated AI system of the DTB system will react or give inputs or commands to change a concave's threshing bar position or configuration.

In addition, contemplated within the scope of the present disclosure described herein that the computer-implemented method, computerized, automated AI system, machine learning or neural network of the DTB system may dynamically, in real time, adjust the combine engine's torque and/or horsepower curve according to the crop and crop characteristics being harvested which may include altering gear ratios, engine control module, electronic control unit, exhaust gas recirculation, selective catalytic reduction, air-fuel ratios, among others.

Here, relative to conventional concaves having each threshing bar independently in a fixed position, the dynamically operated threshing bars of the DTB system, method, and apparatus of the disclosure described herein utilizing an about 45-degree sloped threshing bars (or threshing bar first and second faces having an about 135-degree angle relative to each other) can increase threshing effectiveness by about 50%, reduce grain damage by about 95%, reduce broken cobs by about 90%, increase the combine's bushels per hour by up to 40%, reduce grain loss by about 99%, and increase horsepower by about 25%, among other advantages.

From the foregoing it will be seen that the present disclosure described herein is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts described herein, except insofar as such limitations are included in following claims. Further, it will be understood that certain features and sub-combinations are of utility and may be employed without reference to other features and sub-combinations. This is contemplated by and is within the scope of the claims.

What is claimed is:

1. A concave for threshing crop in a combine harvester, comprising:
    a concave frame having a pair of arcuate side members each having a curvilinear configuration;
    a plurality of threshing bars, wherein a long axis of each of the threshing bars is substantially perpendicular relative to the arcuate side members; and
    an actuator coupled to the threshing bars, wherein the actuator is configured to adjust a spacing between each of the threshing bars relative to each other and move the threshing bars in a longitudinal direction that substantially follows the curvilinear configuration of the arcuate side members of the concave frame.

2. The concave of claim 1, wherein the actuator is operated by one or more controllers.

3. The concave of claim 2, wherein the one or more controllers are operated wirelessly or via a wired connection.

4. The concave of claim 2, wherein the one or more controllers are operated via a central computing system.

5. The concave of claim 4, wherein the central computing system is configured to receive data from one or more sensors in communication with or detecting one or more conditions from the concave frame or the combine harvester.

6. The concave of claim 2, wherein the one or more controllers are operated via an artificial intelligence system, a neural network, or a machine learning algorithm.

7. The concave of claim 6, wherein the artificial intelligence system, neural network, or a machine learning algorithm is configured to receive one or more of the following conditions: crop conditions, harvest conditions, soil conditions, crop characteristics, crop type, crop variety, crop yield, crop moisture, crop test weight, crop protein, crop starch, crop oil, crop volume, crop grade, bulk density, stalk moisture, leaf moisture, combine productivity, engine revolutions per minute (RPM), engine usage, horsepower consumption, fuel consumption, concave clearance, concave pressure, rotor speed, rotor type, pinch point, threshing angle, rotor elements, gear ratio, gear position, power band, sieve loss, shoe loss, separator loss, cleaning loss, separator clearance, grain loss, grain divider position, loss sensitivity, threshing efficiency, separation efficiency, ground speed, elevator speed, elevator throughput, separator pressure, fan speed, feed accelerator speed, cross auger position, drum speed, drum position, paddle speed, paddle position, drum position, auger speed, feeder house position, feederhouse throughput, gathering chain speed, header speed, header width, header cut height, header angle, header throughput, header loss, cutting efficiency, cutter bar position, cutterbar length, deck plate position, stripper plate gap, reel speed, combine angle, pre-sieve position, sieve angle, sieve position, chaffer position, grain distribution, grain throughput, bushels per hour, clean grain foreign material, grain damage, whole grain, grain damage position, broken grain, skinned grain, broken grain and foreign material, broken cobs, stress cracks, fines, dockage, straw quality, grain tank sample, grain size, foreign material, threshed grain, unthreshed grain, grain return, storability, threshing effectiveness, separation effectiveness, operational or performance parameters, operational or performance benchmarks, operational or performance goals, operational or performance priorities, operational or performance sensitivity, weather data, soil data, historical data, fleet information, or global positioning system (GPS) information or historical data from previous harvests or fleet information used to predict variances in yield rates at a particular GPS location.

8. The concave of claim 6, wherein the controller is configured to send commands to the actuator via data received from the artificial intelligence system, the neural network, or the machine learning algorithm.

9. The concave of claim 6, wherein the artificial intelligence system, the neural network, or the machine learning algorithm is configured to receive input data from one or more sensors in communication with or detecting one or more conditions from the concave frame or the combine harvester.

10. The concave of claim 6, wherein the artificial intelligence system, the neural network, or the machine learning algorithm is configured to receive data from one or more of the following sensors: pressure sensors, volume sensors, flow sensors, image sensors, moisture sensors, magnetic sensors, motion sensors or object detection sensors.

11. The concave of claim 6, wherein the artificial intelligence system, the neural network, or the machine learning algorithm is configured to receive data from one or more cameras capturing data from a chaffer, sieve, grain pan, clean grain elevator, grain auger, or grain tank of the combine harvester.

12. The concave of claim 6, wherein the artificial intelligence system, the neural network, or the machine learning algorithm is configured to receive data from a plurality of sensors on the combine harvester.

13. The concave of claim 6, wherein the artificial intelligence system, the neural network, or the machine learning algorithm is configured to receive data from a plurality of cameras on the combine harvester.

14. The concave of claim 2, wherein the one or more controllers are configured to receive data from one or more sensors in communication with or detecting one or more conditions from the concave frame or the combine harvester.

15. A method of threshing crop in a combine harvester, comprising:
    receiving one or more commands to operate one or more actuators in connection with a plurality of threshing bars, wherein the threshing bars are disposed between a pair of arcuate side members of a concave frame, and wherein a length of each of the threshing bars are substantially perpendicular relative to the arcuate side members;
    adjusting, via the actuators, a spacing between the threshing bars; and moving, via the actuators, the threshing bars along the arcuate side members to a first position, wherein the moving step is in a direction that is parallel relative to the arcuate side members and along a length of the arcuate side members.

16. The method of claim 15, further comprising receiving the one or more commands at a controller.

17. The method of claim 16, further comprising operating the controller wirelessly or via a wired connection.

18. The method of claim 16, further comprising operating the controller via a central computing system.

19. The method of claim 16, further comprising operating the controller based on data from an artificial intelligence system, a neural network, or a machine learning algorithm.

20. The method of claim 19, wherein the artificial intelligence system, neural network, or a machine learning algorithm receives one or more of the following conditions: crop conditions, harvest conditions, soil conditions, crop characteristics, crop type, crop variety, crop yield, crop moisture, crop test weight, crop protein, crop starch, crop oil, crop volume, crop grade, bulk density, stalk moisture, leaf moisture, combine productivity, engine revolutions per minute (RPM), engine usage, horsepower consumption, fuel consumption, concave clearance, concave pressure, rotor speed, rotor type, pinch point, threshing angle, rotor elements, gear ratio, gear position, power band, sieve loss, shoe loss, separator loss, cleaning loss, separator clearance, grain loss, grain divider position, loss sensitivity, threshing efficiency, separation efficiency, ground speed, elevator speed, elevator throughput, separator pressure, fan speed, feed accelerator speed, cross auger position, drum speed, drum position, paddle speed, paddle position, drum position, auger speed, feeder house position, feederhouse throughput, gathering chain speed, header speed, header width, header cut height, header angle, header throughput, header loss, cutting efficiency, cutter bar position, cutterbar length, deck plate position, stripper plate gap, reel speed, combine angle, pre-sieve position, sieve angle, sieve position, chaffer position, grain distribution, grain throughput, bushels per hour, clean grain foreign material, grain damage, whole grain, grain damage position, broken grain, skinned grain, broken grain and foreign material, broken cobs, stress cracks, fines, dockage, straw quality, grain tank sample, grain size, foreign material, threshed grain, unthreshed grain, grain return, storability, threshing effectiveness, separation effectiveness, operational or performance parameters, operational or performance benchmarks, operational or performance goals, operational or performance priorities, operational or performance sensitivity, weather data, soil data, historical data, fleet information, or global positioning system (GPS) information or historical data from previous harvests or fleet information used to predict variances in yield rates at a particular GPS location.

* * * * *